US008344045B2

(12) United States Patent
Ohnishi et al.

(10) Patent No.: US 8,344,045 B2
(45) Date of Patent: Jan. 1, 2013

(54) INK COMPOSITION, INKJET RECORDING METHOD, PRINTED MATERIAL, AND PROCESS FOR PRODUCING MOLDED PRINTED MATERIAL

(75) Inventors: Hironori Ohnishi, Ashigarakami-gun (JP); Kazuhiro Yokoi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 209 days.

(21) Appl. No.: 12/725,927

(22) Filed: Mar. 17, 2010

(65) Prior Publication Data

US 2010/0239830 A1 Sep. 23, 2010

(30) Foreign Application Priority Data

Mar. 19, 2009 (JP) ................................ 2009-067877

(51) Int. Cl.
- *B29C 35/08* (2006.01)
- *B29C 43/22* (2006.01)
- *B29C 45/00* (2006.01)
- *B29C 47/00* (2006.01)
- *B29C 59/00* (2006.01)
- *B32B 9/04* (2006.01)
- *B32B 27/00* (2006.01)
- *B32B 27/30* (2006.01)
- *B32B 37/00* (2006.01)
- *B41J 2/01* (2006.01)
- *B41J 2/17* (2006.01)
- *B41J 2/175* (2006.01)
- *B41M 5/00* (2006.01)
- *C08F 2/50* (2006.01)
- *C08F 8/00* (2006.01)
- *C08F 24/00* (2006.01)
- *C08F 30/08* (2006.01)
- *C08F 34/02* (2006.01)
- *C08F 124/00* (2006.01)
- *C08F 134/02* (2006.01)
- *C08F 130/08* (2006.01)
- *C08F 224/00* (2006.01)
- *C08F 230/08* (2006.01)
- *C08F 234/02* (2006.01)
- *C08F 283/12* (2006.01)
- *C08L 83/00* (2006.01)
- *C09D 5/00* (2006.01)
- *C09D 11/00* (2006.01)
- *H05B 6/00* (2006.01)
- *H05B 7/00* (2006.01)

(52) U.S. Cl. ........ 523/160; 264/405; 264/454; 264/509; 264/510; 347/1; 347/85; 347/95; 347/100; 347/102; 347/105; 428/32.1; 428/411.1; 428/447; 428/500; 428/522; 522/6; 522/99; 523/161; 525/100; 525/101; 526/270; 526/279

(58) Field of Classification Search .................. 523/160, 523/161; 525/100, 101; 526/270, 279; 264/405, 264/454, 509, 510; 347/1, 85, 95, 100, 102, 347/105; 428/32.1, 411.1, 447, 500, 522; 522/6, 99

See application file for complete search history.

(56) References Cited

U.S. PATENT DOCUMENTS

| | | | |
|---|---|---|---|
| 6,248,804 B1 | 6/2001 | Lutz | |
| 2008/0316244 A1 | 12/2008 | Lugassi et al. | |

FOREIGN PATENT DOCUMENTS

| | | | |
|---|---|---|---|
| EP | 1 637 926 A2 | 3/2006 |
| EP | 2 088 175 A1 | 8/2009 |
| JP | 2004-536925 A2 | 2/2003 |
| JP | 2004-514014 A | 5/2004 |
| JP | 2004-518787 A | 6/2004 |
| JP | 2008-105393 A | 5/2008 |
| WO | 02/38688 A2 | 5/2002 |
| WO | 02/061002 A2 | 8/2002 |
| WO | 03/010249 A1 | 2/2003 |
| WO | 2008/038508 A1 | 4/2008 |

OTHER PUBLICATIONS

European Search Report dated Jul. 7, 2010.

*Primary Examiner* — Patrick Niland
(74) *Attorney, Agent, or Firm* — Sughrue Mion, PLLC

(57) ABSTRACT

An ink composition is provided that includes (A) a polymerizable silicone compound having an ethylenically unsaturated group and a silicone chain, (B) tetrahydrofurfuryl (meth) acrylate, and (C) a radical polymerization initiator. There are also provided an inkjet recording method that includes ($a^1$) a step of discharging onto a recording medium the ink composition and ($b^1$) a step of curing the ink composition by irradiating the discharged ink composition with actinic radiation, a printed material obtained by the inkjet recording method, and a process for producing a formed printed material that includes ($a^2$) a step of forming an image on a support by discharging the ink composition by an inkjet method, ($b^2$) a step of obtaining a printed material having a cured image on the support by irradiating the obtained image with actinic radiation so as to cure the ink composition, and ($c^2$) a step of molding the printed material.

15 Claims, 2 Drawing Sheets

INK COMPOSITION, INKJET RECORDING METHOD, PRINTED MATERIAL, AND PROCESS FOR PRODUCING MOLDED PRINTED MATERIAL

BACKGROUND OF THE INVENTION

1. Field of the Invention

The present invention relates to an ink composition suitably used for inkjet recording, and an inkjet recording method employing the ink composition, a printed material and a process for producing a formed printed material.

2. Description of the Related Art

As image recording methods for forming an image on a recording medium such as paper based on an image data signal, there are an electrophotographic system, sublimation type and melt type thermal transfer systems, an inkjet system, etc. In the electrophotographic system, a process of forming an electrostatic latent image on a photosensitive drum by electrically charging and exposing is required, and the system is complicated; as a result, there is the problem that the production cost is high. With regard to the thermal transfer system, although the equipment is inexpensive, due to the use of an ink ribbon there is the problem that the running cost is high and waste material is generated.

On the other hand, with regard to the inkjet system, the printing equipment is inexpensive, it is not necessary to use a plate when printing, and since an image is formed directly on a recording medium by discharging an ink composition only on a required image area, the ink composition can be used efficiently and the running cost is low, particularly in the case of small lot production. Furthermore, there is little noise and it is excellent as an image recording system, and has been attracting attention in recent years.

Among them, an inkjet recording ink composition (radiation-curing inkjet recording ink composition), which is curable upon exposure to radiation such as UV rays, is an excellent system from the viewpoint of it being possible to print on various types of substrates because, compared with a solvent-based ink composition, the drying properties are excellent and an image is resistant to spreading since the majority of the components in the ink composition cure upon exposure to radiation such as UV rays.

Furthermore, the ink compositions below are known.

JP-PCT-2004-514014 (JP-PCT denotes a published Japanese translation of a PCT application) discloses an inkjettable radiation-curable inkjet ink composition comprising (a) an oligo/resin component; and (b) a radiation-curing reactive diluent comprising (i) 0.1 to 50 wt % of an adhesion-promoting radiation-curable component comprising one or more heterocyclic radiation-curable monomer and/or an alkoxylated monomer comprising pendant alkoxylated functionality and no main chain alkoxylated functionality, and (ii) no greater than about 10 wt % of an optionally alkoxylated radiation-curable monomer comprising main chain alkoxylated functionality.

JP-PCT-2004-518787 discloses a radiation-curing inkjettable ink composition comprising an oligomer that is a reaction product of components comprising (a) an aliphatic polyisocyanate comprising two or more isocyanate groups and (b) a radiation-curing alcohol comprising one or more radiation-curing moieties, one or more hydroxy moieties, and one or more polycaprolactone ester moieties.

JP-PCT-2004-536925 discloses an inkjet ink composition comprising a colorant, a vehicle, and a specific fluorochemical surfactant.

JP-A-2008-105393 discloses a process for producing a molded printed material comprising (A) a step of forming an image by discharging onto a support by an inkjet method an ink composition comprising, in the ink composition, at least 60 wt % of a monofunctional radically polymerizable monomer having only one unsaturated double bond group selected from the group consisting of an acrylate group, a methacrylate group, an acrylamide group, a methacrylamide group, and an N-vinyl group and at least one group having a cyclic structure, (B) a step of obtaining a printed material having an image cured on the support by irradiating the obtained image with actinic radiation so as to cure the ink composition, and (C) a step of molding the printed material.

BRIEF SUMMARY OF THE INVENTION

The ink compositions described in patent documents cited above do not have adequate molding suitability.

Furthermore, it has been found that the ink composition described in JP-PCT-2008-105393 gives cracks in an edge portion when molding involving hole making.

It is an object of the present invention to provide an ink composition that has excellent curability and gives an image having excellent anti-blocking properties and stretchability, an inkjet recording method that employs the ink composition, a printed material having excellent molding suitability, and a process for producing a formed printed material.

The above-mentioned object has been attained by means described in (1) and (12) to (14) below. They are described below together with (2) to (11), which are preferred embodiments.

(1) An ink composition comprising (A) a polymerizable silicone compound having an ethylenically unsaturated group and a silicone chain, (B) tetrahydrofurfuryl (meth)acrylate, and (C) a radical polymerization initiator, (2) the ink composition according to (1), wherein the ethylenically unsaturated group is selected from the group consisting of a (meth)acryloyloxy group, a vinyl group, an N-vinyl group, a (meth)acrylamide group, and an allyl group, (3) the ink composition according to (1) or (2), wherein the ethylenically unsaturated group is a (meth)acryloyloxy group or an allyl group, (4) the ink composition according to any one of (1) to (3), wherein the polymerizable silicone compound (A) has a dimethylsiloxane chain and an alkyleneoxy chain, (5) the ink composition according to any one of (1) to (4), wherein the polymerizable silicone compound (A) is a compound represented by Formula (3),

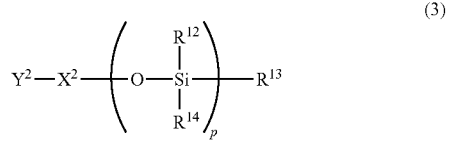

wherein $Y^2$ denotes an ethylenically unsaturated group-containing polymer chain, $X^2$ denotes a single bond or a divalent organic linking group, p denotes an integer of 1 or greater, $R^{12}$, $R^{13}$, and $R^{14}$ independently denote a hydrogen atom, a phenyl group, or an alkyl group having 1 to 18 carbon atoms, and when p is 2 or greater the plurality of $R^{12}$s may be identical groups or different groups and the plurality of $R^{14}$s may be identical groups or different groups, (6) the ink composition according to (5), wherein $Y^2$ is an acrylic resin or methacrylic resin polymer chain,
(7) the ink composition according to (5) or (6), wherein the polymerizable silicone compound (A) is represented by Formula (3), and the ethylenically unsaturated group-containing polymer chain denoted by $Y^2$ is a copolymer of a compound represented by Formula (4) and another (meth) acrylic acid ester,

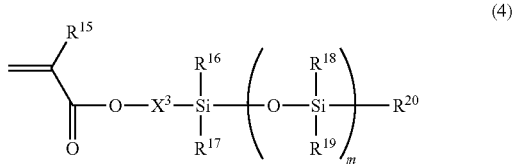

(4)

wherein $R^{15}$ denotes a hydrogen atom, a methyl group, or an ethyl group, $R^{16}$, $R^{17}$, $R^{18}$, $R^{19}$, $R^{20}$ independently denote a hydrogen atom, a phenyl group, or an alkyl group having 1 to 18 carbon atoms, $X^3$ denotes a divalent linking group, and m denotes a positive integer
(8) the ink composition according to (7), wherein the polymerizable silicone compound (A) is a copolymer represented by Formula (5).

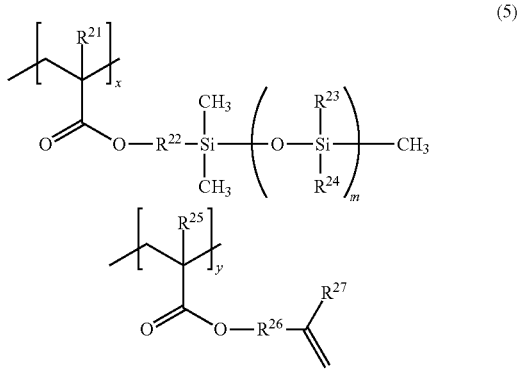

(5)

wherein $R^{21}$, $R^{23}$, $R^{24}$, $R^{25}$, and and $R^{27}$ independently denote a lower alkyl group, $R^{22}$ and $R^{26}$ denote a divalent organic linking group, m denotes a positive integer, and x and y denote copolymerization proportions
(9) the ink composition according to any one of (1) to (8), wherein the polymerizable silicone compound (A) has a number-average molecular weight of 1,000 to 100,000,
(10) the ink composition according to any one of (1) to (9), wherein it further comprises N-vinylcaprolactam,
(11) the ink composition according to (10), wherein the total amount of N-vinylcaprolactam and tetrahydrofurfuryl (meth)acrylate is at least 60 wt % of the total weight of the ink composition,
(12) an inkjet recording method comprising
  ($a^1$) a step of discharging onto a recording medium the ink composition according to any one of (1) to (11), and
  ($b^1$) a step of curing the ink composition by irradiating the discharged ink composition with actinic radiation,
(13) a printed material obtained by the inkjet recording method according to (12), and
(14) a process for producing a formed printed material comprising ($a^2$) a step of forming an image on a support by discharging the ink composition according to any one of (1) to (11) by an inkjet method, ($b^2$) a step of obtaining a printed material having a cured image on the support by irradiating the obtained image with actinic radiation so as to cure the ink composition, and ($c^2$) a step of molding the printed material.

In accordance with the present invention, there can be provided an ink composition that has excellent curability and gives an image having excellent anti-blocking properties and stretchability, an inkjet recording method that employs the ink composition, a printed material having excellent molding suitability, and a process for producing a formed printed material.

Figure 1:
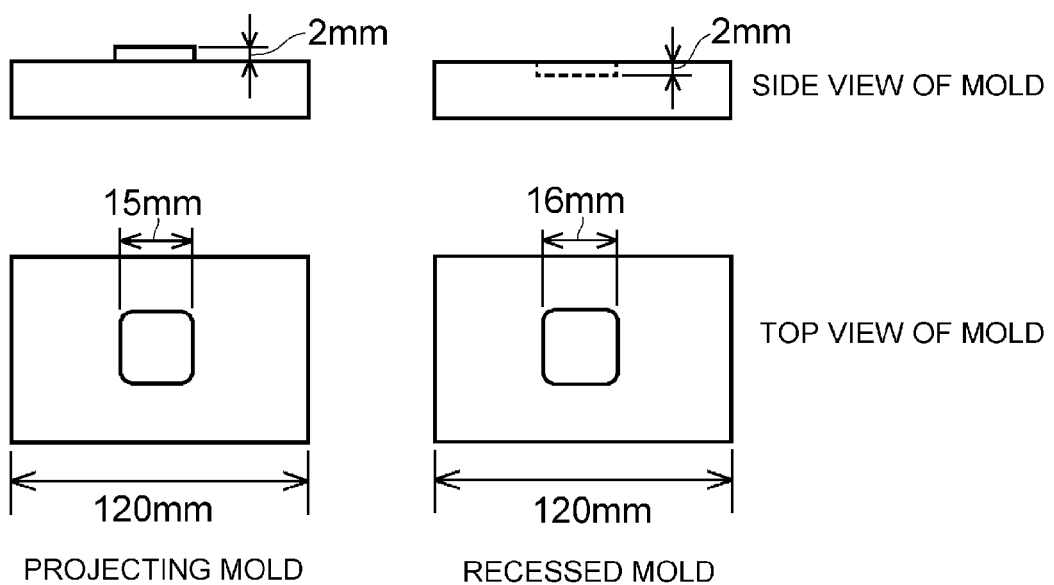
FIG. 1 shows a schematic diagram of a convex mold and a concavoconvex mold used in an embossing test.

DETAILED DESCRIPTION OF THE UNVENTION (1) Ink Composition

The ink composition of the present invention (in the present invention, an 'ink composition' is also called simply an 'ink') comprises (A) a polymerizable silicone compound having an ethylenically unsaturated group and a silicone chain, (B) tetrahydrofurfuryl (meth)acrylate, and (C) a radical polymerization initiator.

The description '(meth)acrylate' here means acrylate and/or methacrylate. The same applies to a (meth)acrylic resin.

Furthermore, a 'lower alkyl group' denotes an alkyl group having 1 to 5 carbon atoms. An 'alkyl group' includes both a straight chain form and a branched form unless stated otherwise.

When a numerical range is expressed in the form of 'a lower limit to an upper limit', this means that the numerical range includes the upper limit value and the lower limit value.

Furthermore, a specific group (atomic group) such as an alkyl group or an aryl group includes one that is unsubstituted as well as one that has a substituent. For example, an 'alkyl group' includes an unsubstituted alkyl group as well as an alkyl group having a substituent (substituted alkyl group). A substituent allowed here is one that is inactive and does not change the chemical functionality characteristic of a compound containing the specific group; examples of allowed substituents include a halogen atom, an alkoxy group, and a hydroxy group.

The ink composition of the present invention may be used suitably as an inkjet recording ink composition.

Furthermore, the ink composition of the present invention may be used suitably as an ink composition for molding/printing. A printed material obtained using the ink composition of the present invention has excellent embossing properties, vacuum forming properties, and hole making properties.

Moreover, the ink composition of the present invention may comprise as necessary, in addition to the components (A) to (C) above, a colorant, a dispersant, a surfactant, and/or a polymerizable compound other than tetrahydrofurfuryl (meth)acrylate (B).

The ink composition that can be used in the present invention is an ink composition that is curable upon exposure to actinic radiation.

The 'actinic radiation' referred to in the present invention is not particularly limited as long as it is actinic radiation that can provide energy that enables an initiating species to be generated in the ink composition when irradiated, and broadly includes α rays, γ rays, X rays, UV rays, visible light, and an electron beam; among these, UV rays and an electron beam are preferable from the viewpoint of curing sensitivity and the availability of equipment, and UV rays are particularly preferable. In the present invention, the ink composition is therefore preferably an ink composition that is curable upon exposure to UV rays as radiation.

The components are each explained below.

(A) Polymerizable Silicone Compound Having an Ethylenically Unsaturated Group and a Silicone Chain The ink composition of the present invention comprises 'a polymerizable silicone compound' having an ethylenically unsaturated group (being synonymous with 'ethylenically unsaturated double bond') and a silicone chain.

Preferred examples of an ethylenically unsaturated group include a (meth)acryloyloxy group, a vinyl group, an N-vinyl group, an acrylamide group, and an allyl group. Among them, a (meth)acryloyloxy group, a vinyl group, and an allyl group are more preferable, a (meth)acryloyloxy group and a vinyl group are still more preferable and a (meth)acryloyloxy group is especially preferable. Using a compound having the ethylenically unsaturated group enables an ink composition that gives excellent anti-blocking properties and excellent stretchability for a cured coating to be obtained.

With regard to the ethylenically unsaturated group possessed by the polymerizable silicone compound, there may be only one type, or two or more different types may be used in combination.

Furthermore, it is preferable for the number of ethylenically unsaturated groups in the molecule to be at least 2, more preferably at least 4, yet more preferably at least 6, and particularly preferably at least 10. Due to there being a large number of functional groups, the hardness of the outermost surface of the coating increases, and good surface curability and anti-blocking properties can be obtained.

The silicone chain is preferably a silicone chain having at least a unit structure represented by Formula (1) below.

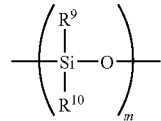

(1)

In Formula (1), $R^1$ and $R^2$ independently denote a phenyl group or an optionally branched alkyl group having 1 to 18 carbons.

It is preferable that at least one of $R^1$ and $R^2$ in Formula (1) is a methyl group, and it is more preferable that both $R^1$ and $R^2$ are methyl groups.

Examples of the polymerizable silicone compound that can preferably be used in the present invention include a modified silicone compound represented by Formula (2-1) or Formula (2-2) below. A modified silicone compound represented by Formula (2-2) is more preferable.

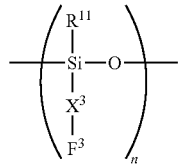

(2-1)

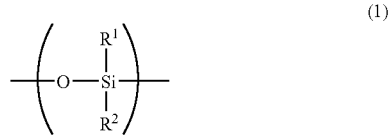

(2-2)

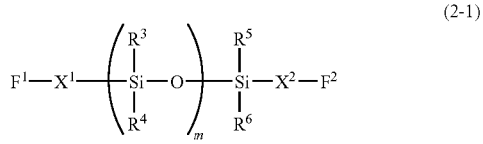

In Formulae (2-1) and (2-2), $R^3$, $R^4$, $R^5$, $R^6$, $R^7$, $R^8$, $R^9$, $R^{10}$, and $R^{11}$ independently denote a phenyl group or an optionally branched alkyl group having 1 to 18 carbons. $X^1$, $X^2$, and $X^3$ independently denote a single bond or a divalent linking group (organic group), m denotes an integer of at least 0, and n denotes an integer of at least 1. $F^1$ and $F^3$ independently denote a group having an ethylenically unsaturated group. $F^2$ denotes a group having an ethylenically unsaturated group, an optionally substituted alkyl group having 1 to 18 carbons, or a phenyl group.

In a compound represented by Formula (2-1) or Formula (2-2), when there are a plurality of groups selected from the group consisting of $R^3$, $R^4$, $R^9$, $R^{10}$, $R^{11}$, $X^1$, $X^2$, $X^3$, and $F^3$, they may be identical groups or different groups.

The three $R^8$s may be identical to or different from each other.

In Formula (2-2), siloxane units [A][B] denote that units represented by Formula [A] and/or Formula [B] are freely linked, and units represented by Formula [A] and/or Formula [B] may be present randomly in the siloxane chain or may be present as a block. Furthermore, when there are a plurality of units represented by Formula [A] present in a compound represented by Formula (2-2), they may have the same structure or different structures. This also applies to a case in which there are a plurality of units represented by Formula [B] present.

In Formula (2-2), $R^3$, $R^4$, $R^5$, $R^6$, $R^7$, $R^8$, $R^9$, $R^{10}$, and $R^{11}$ independently preferably denote a phenyl group, a methyl group, or an ethyl group, and more preferably a methyl group.

In Formula (2-2), $X^1$, $X^2$, and $X^3$ are independently preferably a single bond, a polyethylene glycol chain, a polypropylene glycol chain, a polytetraethylene glycol chain, a polyacrylate chain, a polymethacrylate chain, a polycaprolactone chain, a polycaprolactam chain, or a chain in which two or more of the above chains are combined, and more preferably comprise at least a polyethylene glycol chain. When a polyethylene glycol chain is employed, the localization ratio of the silicone compound on the surface of a cured coating is high, thus further enhancing the effect of improving the anti-blocking properties.

The weight-average molecular weight of the compound having an ethylenically unsaturated group and a silicone chain is preferably 500 to 100,000, more preferably 1,000 to 50,000, and particularly preferably 10,000 to 30,000. In the above-mentioned range, good resistance to hardening and good anti-blocking properties are exhibited, and the ink composition can be maintained at a low viscosity.

Modified silicone compounds represented by Formula (2-1) that can suitably be used in the present invention are listed below.

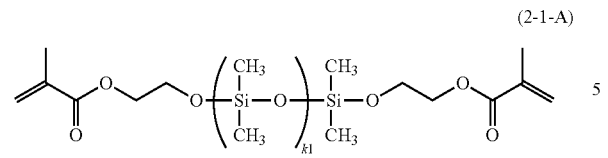
(2-1-A)
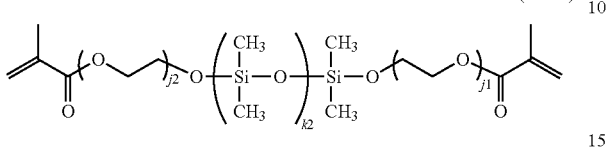
(2-1-B)
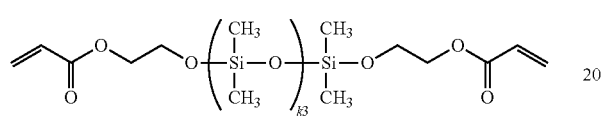
(2-1-C)
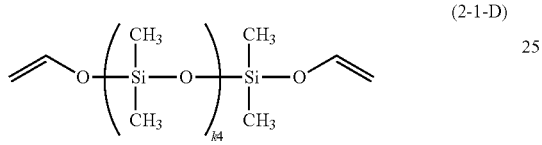
(2-1-D)
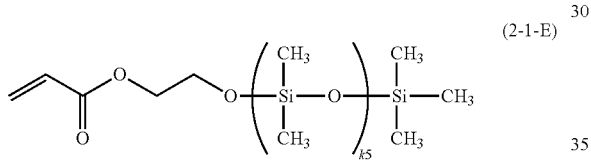
(2-1-E)
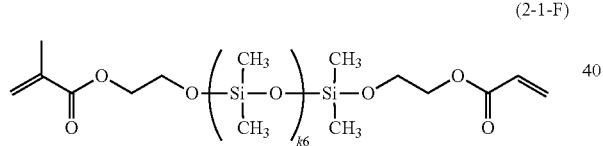
(2-1-F)
wherein k1, k2, k3, k4, k5, k6, and j1 denote independently an integer of at least 0.
Modified silicone compounds represented by Formula (2-2) that can suitably be used in the present invention are listed below. Ph denotes a phenyl group.
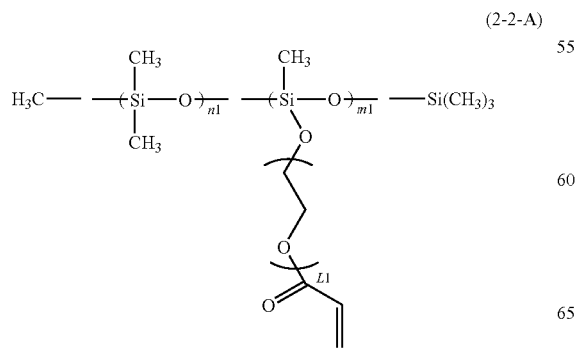
(2-2-A)
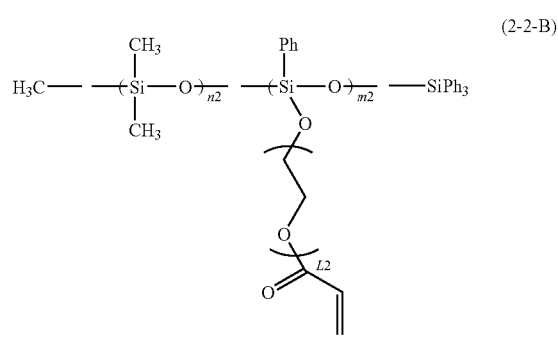
(2-2-B)
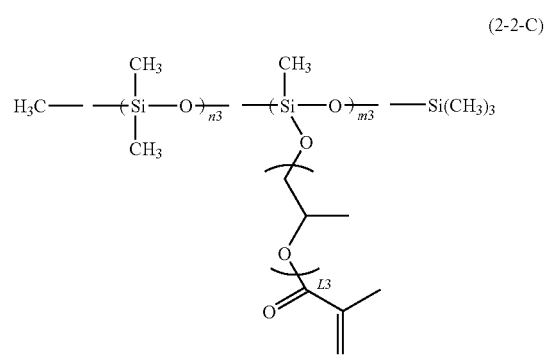
(2-2-C)
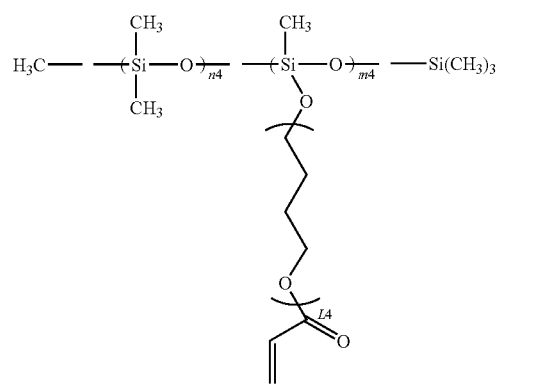
(2-2-D)
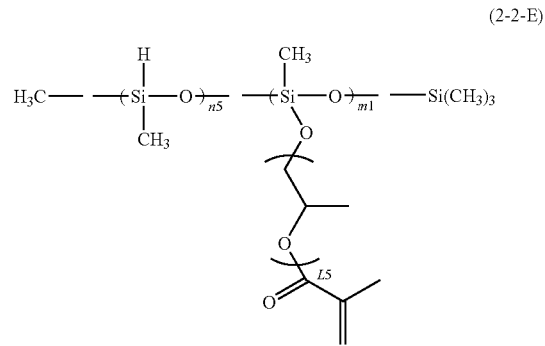
(2-2-E)

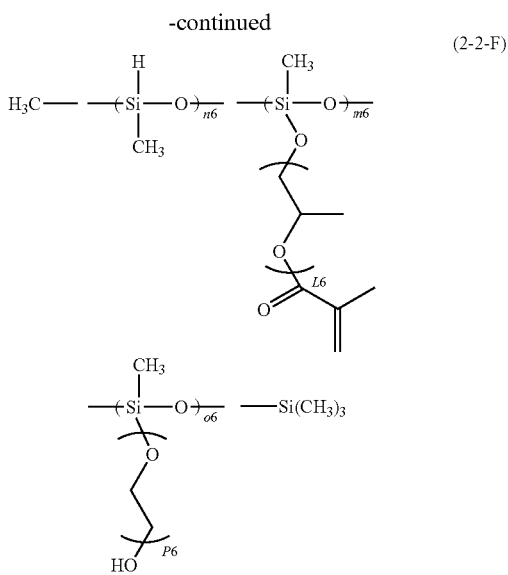

(2-2-F)

resin, a polyester resin, a polyurethane resin, a polycarbonate resin, a polyamide resin, a polyacetal resin, a phenol/formaldehyde condensation resin, a polyvinylphenol resin, a maleic anhydride/α-olefin resin, and an α-hetero substituted methacrylic resin. Among them, as the polymer residue, an acrylic resin, a methacrylic resin, a styryl resin, a polyester resin, and a polyurethane resin are preferable, and an acrylic resin or a methacrylic resin is more preferable.

A polymerizable silicone compound in which the high molecular weight chain denoted by $Y^2$ is an acrylic resin is preferably obtained by copolymerization of a monomer represented by Formula (4) below with another radically polymerizable monomer.

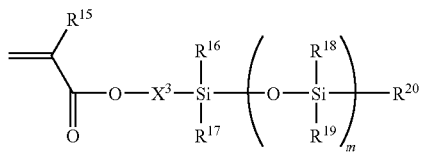

(4)

In Formulae (2-2-A) to (2-2-F) above, n1 to n6 independently denote an integer of at least 0. k1 to k6, j1 to j2, m1 to m6, L1 to L6, o6, and P6 independently denote an integer of at least 1.

In the present invention, the proportion of the polymerizable silicone compound in the ink composition, relative to the total amount of the ink composition, is preferably at least 0.3 wt % but no greater than 10.0 wt %, more preferably at least 0.5 wt % but no greater than 8.0 wt %, yet more preferably at least 0.8 wt % but no greater than 7.0 wt %, and particularly preferably at least 1.0 wt % but no greater than 5.0 wt %.

As a preferred embodiment of the compound having an ethylenically unsaturated group and a silicone chain in the present invention, a polymer having a unit structure represented by Formula (3) below can be cited.

In Formula (4), $R^{15}$ denotes a hydrogen atom, a halogen atom, an optionally substituted methyl group, or an optionally substituted ethyl group. $R^{16}$, $R^{17}$, $R^{18}$, $R^{19}$, and $R^{20}$ independently denote a hydrogen atom, a phenyl group, or an optionally branched alkyl group having 1 to 18 carbons. $X^3$ denotes a divalent linking group. m denotes a positive integer.

The groups represented by $R^{16}$, $R^{17}$, $R^{18}$, $R^{19}$, and $R^{20}$ may have a substituent such as a hydroxyl group, a mercapto group, an epoxy group, or an amino group.

$X^3$ is preferably an alkylene group, an alkyleneoxy group, or a polyalkyleneoxy group, and more preferably an alkylene group having 2 to 6 carbons, or polyalkyleneoxy group having 2 to 6 carbons and yet more preferably an alkylene group having 2 to 6 carbons.

Polymerizable silicone compound (A) is preferably a copolymer represented by Formula (5).

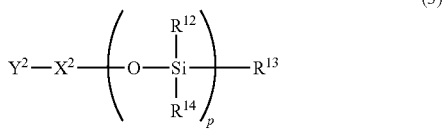

(3)

In Formula (3), $Y^2$ denotes an ethylenically unsaturated group-containing polymer residue, $X^2$ denotes a single bond or a divalent linking group, p denotes an integer of 1 or greater, and $R^{12}$, $R^{13}$, and $R^{14}$ independently denote a hydrogen atom, a phenyl group, or an optionally branched alkyl group having 1 to 18 carbons.

When p is 2 or greater, that is, there are a plurality of $R^{12}$s and $R^{14}$s in a compound represented by Formula (3), the plurality of $R^{12}$s and the plurality of $R^{14}$s each may be identical groups or different groups.

The groups represented by $R^{12}R^{13}$, and $R^{14}$ may have a substituent such as a hydroxyl group, a mercapto group, an epoxy group, or an amino group as a substituent.

$X^2$ is preferably an alkylene group, an alkyleneoxy group, or a polyalkyleneoxy group, and more preferably an alkylene group having 2 to 6 carbons, an alkyleneoxy group having 2 to 6 carbons, or a polyalkyleneoxy group having 2 to 6 carbons.

In Formula (3), examples of the polymer residue denoted by $Y^2$ include an acrylic resin, a methacrylic resin, a styryl

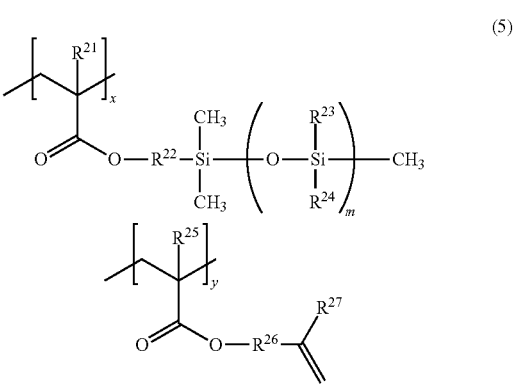

(5)

wherein $R^{21}$, $R^{25}$ and $R^{27}$ independently denote a hydrogen atom, or methyl group, $R^{23}$ and $R^{24}$ independently denote a lower alkyl group or phenyl group, $R^{22}$ and $R^{26}$ denote a divalent organic linking group, m denotes a positive integer, and x and y denote copolymer ratios.

In Formula (5), both $R^{21}$ and $R^{25}$ are preferably a methyl group, both $R^{23}$ and $R^{24}$ are preferably a methyl group, $R^{22}$ and $R^{26}$ are preferably a straight-chain alkylene group having 1 to 4 carbons, $R^{22}$ is preferably a propylene group, $R^{26}$ is preferably a methylene group or ethyloxycarbonyl group (from the side of oxygen atom), m is preferably an integer of 1 to 20, more preferably an integer of 2 to 10, especially preferably an integer of 3 to 10, x is preferably 70 to 95 mol %, and y is preferably 30 to 5 mol %. Furthermore, an ethylenically unsaturated group in a side chain is preferably an allyl group or a methacryloyloxy group.

Furthermore, $R^{23}$ and $R^{24}$ are independently preferably a lower alkyl group, and more preferably both are a methyl group.

Examples of a polymerizable silicone compound in which the polymer residue denoted by $Y^2$ in Formula (3) above that is suitably used in the present invention is an acrylic resin or a methacrylic resin are listed below.

(P-1)

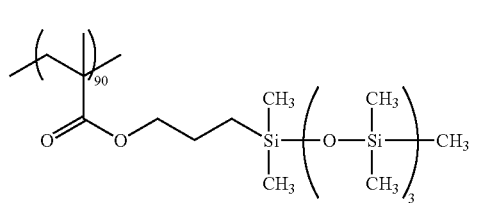

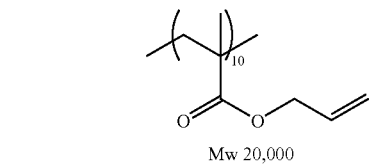

Mw 20,000

(P-2)

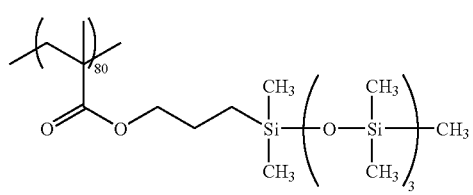

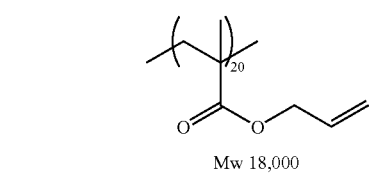

Mw 18,000

(P-3)

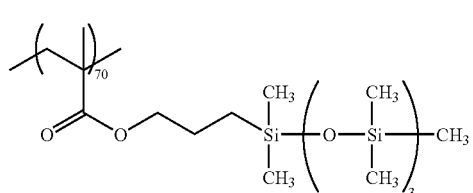

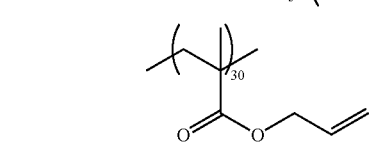

Mw 15,000

(P-4)

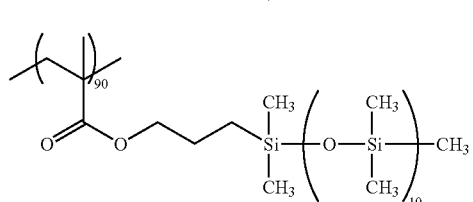

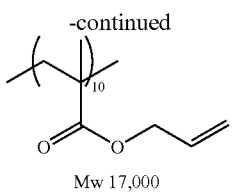

Mw 17,000

(P-5)

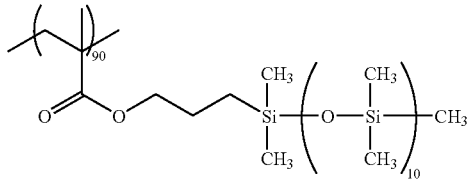

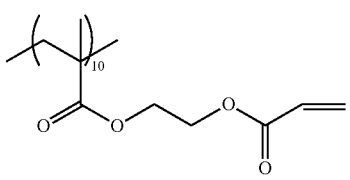

Mw 22,000

(P-6)

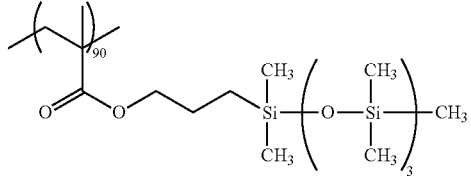

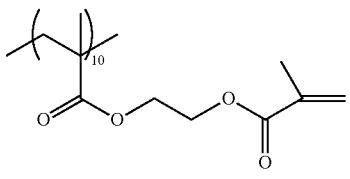

Mw 18,000

(P-7)

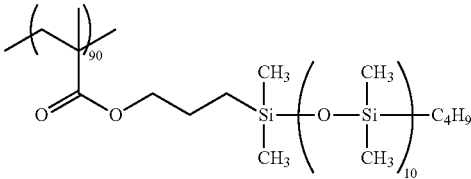

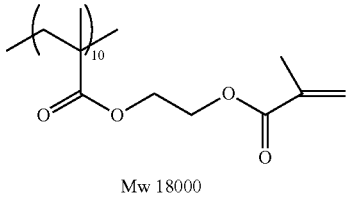

Mw 18000

(P-8)

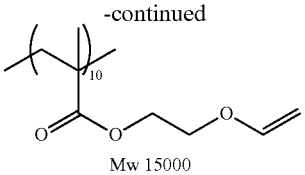

Mw 15000

(P-9)

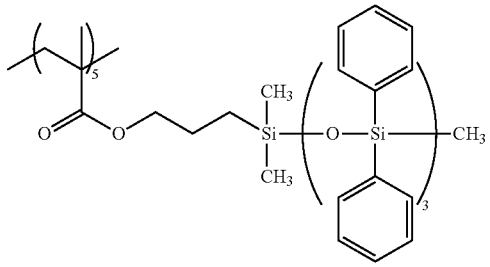

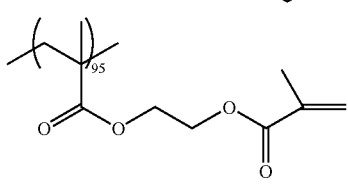

Mw 12000

(P-10)

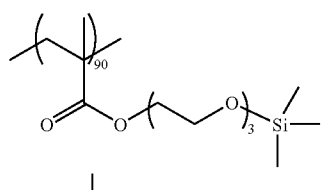

Mw 17000

(P-11)

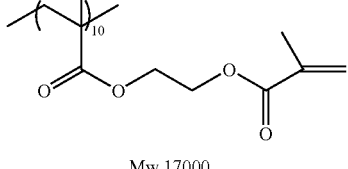

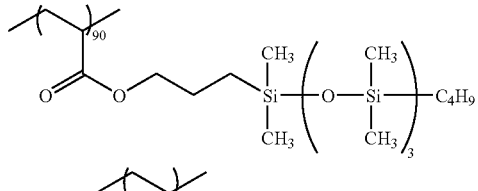

Mw 12000

In the present invention, as the polymerizable silicone compound having an ethylenically unsaturated group and a silicone chain, the commercially available materials below may be used.

EBECRYL 350 and EBECRYL 4842 (both manufactured by Daicel-Cytec), PERENOL S-5 (manufactured by Cognis), RC149, RC300, RC450, RC709, RC710, RC711, RC720, and RC802 (all manufactured by Goldschmidt Chemical Corporation), FM0711, FM0721, FM0725, and PS583 (all manufactured by Chisso Corporation), KP-600, X-22-164, X-22-164AS, X-22-164A, X-22-164B, X-22-164C, and X-22-164E (all manufactured by Shin-Etsu Chemical Co., Ltd.), BYK UV3500, BYK UV3570, and BYK Silclean 3700 (all manufactured by BYK Chemie), TEGO Rad 2100, TEGO Rad 2200N, TEGO Rad 2250N, TEGO Rad 2300, TEGO Rad 2500, TEGO Rad 2600, and TEGO Rad 2700 (all manufactured by Degussa AG), and DMS-V00, DMS-V03, DMS-V05, DMS-V21, DMS-V22, DMS-V25, DMS-V25R, DMS-V31, DMS-V33, DMS-V35, DMS-V41, DMS-V42, DMS-V46, DMS-V52, DMS-V25R, DMS-V35R, PDV-0325, PDV 0331, PDV 0341, PDV 0346, PDV 0525, PDV 0541, PDV 1625, PDV 1631, PDV 1635, PDV 1641, PDV 2331, PDV 2335, PMV-9925, PW-3522, FMV-4031, EDV-2025, VDT-123, VDT-127, VDT-131, VDT-153, VDT-431, VDT-731, VDT-954, VDS-2513, VDV-0131, VGM-021, VGP-061, VGF-991, VQM-135, VQM-146, VQX-221, VMS-005, VMS-T11, VTT-106, MTV-124, VAT-4326, VBT-1323, VPT-1323, VMM-010, VEE-005, and VPE-005 (all manufactured by Gelest, Inc.).

(B) Tetrahydrofurfuryl (Meth)Acrylate

The ink composition of the present invention comprises (B) tetrahydrofurfuryl (meth)acrylate (compound represented by Formula (B) below).

$$\text{(B)}$$

wherein R' denotes a hydrogen or a methyl group.

Tetrahydrofurfuryl acrylate may be used more preferably than tetrahydrofurfuryl methacrylate. The content of tetrahydrofurfuryl (meth)acrylate, relative to the total weight of the ink composition, is preferably 30 to 90 wt %, and more preferably 35 to 85 wt %.

In the present invention, it is preferable to use an ink composition comprising 0.1 to 10 wt % of the polymerizable silicone compound (A), 35 to 85 wt % of tetrahydrofurfuryl (meth)acrylate (B), and a necessary and sufficient amount of the radical polymerization initiator for photocuring. A preferred amount of the radical polymerization initiator added is explained later.

(C) Radical Polymerization Initiator

As a radical polymerization initiator that can be used in the present invention, a known radical polymerization initiator may be used. The polymerization initiator that can be used in the present invention may be used singly or in a combination of two or more types. Furthermore, the radical polymerization initiator may be used in combination with a cationic polymerization initiator.

The polymerization initiator that can be used in the ink composition of the present invention is a compound that forms a polymerization initiating species by absorbing external energy. The external energy used for initiating polymerization can be broadly divided into heat and actinic radiation, a thermal polymerization initiator and a photopolymerization initiator are used respectively, and a photopolymerization initiator are preferably used. Examples of the actinic radiation include γ rays, β rays, an electron beam, ultraviolet rays, visible light, and infrared rays, and preferred examples include ultraviolet rays.

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound. With regard to these radical polymerization initiators, the above-mentioned compounds (a) to (m) may be used singly or in combination. The radical polymerization initiator in the present invention may suitably be used singly or in a combination of two or more types.

Preferred examples of the aromatic ketone (a) and the thio compound (e) include a compound having a benzophenone skeleton or a compound having a thioxanthone skeleton (thioxanthone compound) described in 'RADIATION CURING IN POLYMER SCIENCE AND TECHNOLOGY' J. P. FOUASSIER and J. F. RABEK (1993), pp. 77 to 117. Preferred examples of the aromatic ketone (a), the acylphosphine compound (b) and the thio compound (e) include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864.

Examples of the benzophenone compound include benzophenone, 4-phenylbenzophenone, isophthalophenone, and 4-benzoyl-4'-methylphenylsulfide. Examples of the thioxanthone compound include 2,4-diethylthioxanthone, 2-isopropylthioxanthone, and 2-chlorothioxanthone.

The aromatic ketone (a) is preferably an α-hydroxyketone, and examples thereof include 1-[4-(2-hydroxyethoxy)phenyl]-2-hydroxy-2-methyl-1-propan-1-one, 2-hydroxy-2-methyl-1-phenylpropan-1-one, and 1-hydroxycyclohexyl phenyl ketone.

Among them, the aromatic ketone (a) is particularly preferably a 1-hydroxycyclohexyl phenyl ketone compound. The 1-hydroxycyclohexyl phenyl ketone compound referred to in the present invention means 1-hydroxycyclohexyl phenyl ketone and a compound obtained by substituting 1-hydroxycyclohexyl phenyl ketone with any substituent. The substituent may be selected freely from a range that enables an ability as a radical polymerization initiator to be exhibited, and specific examples thereof include an alkyl group (e.g. a methyl group, an ethyl group, a propyl group, a butyl group, etc.).

The acylphosphine compound (b) is preferably an acylphosphine oxide compound.

Examples of the acylphosphine oxide compound include a compound having a structure represented by Formula (7) or (8).

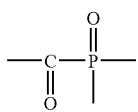

(7)

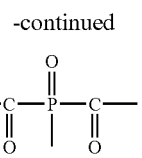

(8)

The acylphosphine oxide compound is particularly preferably one having a chemical structure represented by Formula (9) or (10).

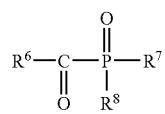

(9)

wherein $R_6$, $R_7$, and $R_8$ denote an aromatic hydrocarbon group, which may have a methyl group or an ethyl group as a substituent.

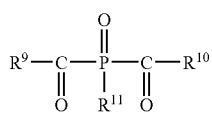

(10)

wherein $R^9$, $R^{10}$, and $R^{11}$ denote an aromatic hydrocarbon group, which may have a methyl group or an ethyl group as a substituent.

As the acylphosphine oxide compound, a monoacylphosphine oxide compound, a bisacylphosphine oxide compound, etc. may be used, and as the monoacylphosphine oxide compound, a known monoacylphosphine oxide compound may be used. Examples thereof include monoacylphosphine oxide compounds described in JP-B-60-8047 and JP-B-63-40799. Specific examples thereof include methyl isobutyrylmethylphosphinate, methyl isobutyrylphenylphosphinate, methyl pivaloylphenylphosphinate, methyl 2-ethylhexanoylphenylphosphinate, isopropyl pivaloylphenylphosphinate, methyl p-tolylphenylphosphinate, methyl o-tolylphenylphosphinate, methyl 2,4-dimethylbenzoylphenylphosphinate, isopropyl p-t-butylbenzoylphenylphosphinate, methyl acryloylphenylphosphinate, isobutyryldiphenylphosphine oxide, 2-ethylhexanoyldiphenylphosphine oxide, o-tolyldiphenylphosphine oxide, p-t-butylbenzoyldiphenylphosphine oxide, 3-pyridylcarbonyldiphenylphosphine oxide, acryloyldiphenylphosphine oxide, benzoyldiphenylphosphine oxide, vinyl pivaloylphenylphosphinate, adipoyl-bisdiphenylphosphine oxide, pivaloyldiphenylphosphine oxide, p-tolyldiphenylphosphine oxide, 4-(t-butyl)benzoyldiphenylphosphine oxide, terephthaloyl-bis-diphenylphosphine oxide, 2-methylbenzoyldiphenylphosphine oxide, versatoyldiphenylphosphine oxide, 2-methyl-2-ethylhexanoyldiphenylphosphine oxide, 1-methylcyclohexanoyldiphenylphosphine oxide, methyl pivaloylphenylphosphinate, and isopropyl pivaloylphenylphosphinate.

As the bisacylphosphine oxide compound, a known bisacylphosphine oxide compound may be used. Examples thereof include bisacylphosphine oxide compounds described in JP-A-3-101686, JP-A-5-345790, and JP-A-6-298818. Specific examples thereof include bis(2,6-dichlorobenzoyl)phenylphosphine oxide, bis(2,6-dichlorobenzoyl)-2,5-dimethylphenylphosphine oxide, bis(2,6- dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis (2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis (2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis (2-methyl-1-naphthoyl)-4-propylphenylphosphine oxide, bis (2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

Among them, preferred examples of the acylphosphine oxide compound in the present invention include bis(2,4,6-trimethylbenzoyl)phenylphosphine oxide (Irgacure 819: manufactured by Ciba Specialty Chemicals), bis(2,6-dimethoxybenzoyl)-2,4,4-trimethylpentylphenylphosphine oxide, and 2,4,6-trimethylbenzoyldiphenylphosphine oxide (Darocur TPO: manufactured by Ciba Specialty Chemicals, Lucirin TPO: manufactured by BASF).

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4,760,013, 4,734,444, and 2,833,827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, and di-t-butyldiperoxyisophthalate.

As the hexaarylbiimidazole compound (f), there can be cited lophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4',5,5'-tetraphenylbiimidazole.

As the ketoxime ester compound (g), there can be cited 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compound (h) include compounds described in U.S. Pat. Nos. 3,567,453 and 4,343,891, and EP Nos. 109,772 and 109,773.

Examples of the azinium salt compound (i) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-2-4705, and iron-arene complexes described JP-A-1-304453 and JP-A-1-152109.

Specific examples of the titanocene compound include dicyclopentadienyl-Ti-dichloride, dicyclopentadienyl-Ti-bis-phenyl, di-cyclopentadienyl-Ti-bis-2,3,4,5,6-pentafluorophen-1-yl, dicyclopentadienyl-Ti-bis-2,3,5,6-tetrafluorophen-1-yl, dicyclopentadienyl-Ti-bis-2,4,6-trifluorophen-1-yl, dicyclopentadienyl-Ti-2,6-difluorophen-1-yl, dicyclopentadienyl-Ti-bis-2,4-difluorophen-1-yl, dimethyl-cyclopentadienyl-Ti-bis-2,3,4,5,6-pentafluorophen-1-yl, dimethylcyclopentadienyl-Ti-bis-2,3,5,6-tetrafluorophen-1-yl, dimethylcyclopentadienyl-Ti-bis-2,4-difluorophen-1-yl, bis(cyclopentadienyl)-bis(2,6-difluoro-3-(pyrrol-1-yl)phenyl)titanium, bis(cyclopentadienyl)bis[2,6-difluoro-3-(methylsulfonamido)phenyl]titanium, and bis(cyclopentadienyl)bis[2,6-difluoro-3-(N-butylbiaroylamino)phenyl]titanium.

Examples of the active ester compound (k) include nitrobenzyl ester compounds described in EP Nos. 0290750, 046083, 156153, 271851, and 0388343, U.S. Pat. Nos. 3,901,710 and 4,181,531, JP-A-60-198538, and JP-A-53-133022, iminosulfonate compounds described in EP Nos. 0199672, 84515, 199672, 044115, and 0101122, U.S. Pat. Nos. 4,618,564, 4,371,605, and 4431774, JP-A-64-18143, JP-A-2-245756, and JP-A-4-365048, and compounds described in JP-B-62-6223, JP-B-63-14340, and JP-A-59-174831.

Preferred examples of the compound (l) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

The ink composition of the present invention preferably comprises an acylphosphine oxide compound; it is preferable to use in combination an acylphosphine compound and a benzophenone compound or thioxanthone compound, and it is more preferable to use in combination an acylphosphine compound and an α-aminoketone compound. It is particularly preferable to use in combination an acylphosphine compound and a benzophenone compound. Due to the above-mentioned combination, an ink composition having excellent curability and anti-blocking properties can be obtained.

When a cationically polymerizable compound is used in the present invention, it is preferable to use a cationic polymerization initiator in combination with a cationic polymerization compound. Examples of the cationic polymerization initiator (photo-acid generator) that can be used in the present invention include compounds used in chemically amplified photoresists and cationic photopolymerization ('Imejingu you Yukizairyou' (Organic Materials for Imaging), Ed. The Japanese Research Association for Organic Electronics Materials, Bunshin Publishing Co. (1993), pp. 187-192).

Firstly, $B(C_6F_6)_4^-$, $PF_6^-$, $AsF_6^-$, $SbF_6^-$, and $CF_3SO_3^-$ salts of aromatic onium (e.g. diazonium, ammonium, iodonium, sulfonium, phosphonium) compounds can be cited. Secondly, sulfonated materials that generate a sulfonic acid can be cited. Thirdly, halides that photogenerate a hydrogen halide can also be used. Fourthly, iron arene complexes can be cited.

In the ink composition of the present invention, the total amount of radical polymerization initiator used is preferably 0.01 to 35 wt % relative to the total amount of polymerizable compounds used including tetrahydrofurfryl acrylate, more preferably 0.5 to 20 wt %, and yet more preferably 1.0 to 15 wt %. The ink composition can be cured sufficiently with 0.01 wt % or greater of polymerization initiator, and a cured film having a uniform degree of curing can be obtained with 35 wt % or less.

Furthermore, when a sensitizer, which will be described later, is used in the ink composition of the present invention, the total amount of the radical polymerization initiator used is preferably 200:1 to 1:200 relative to the sensitizer as a ratio by weight of radical polymerization initiator:sensitizer, more preferably 50:1 to 1:50, and yet more preferably 20:1 to 1:5.

Polymerizable Compound Other than Tetrahydrofurfuryl Acrylate

The ink composition of the present invention may comprise a polymerizable compound other than tetrahydrofurfuryl acrylate.

The polymerizable compound other than tetrahydrofurfuryl acrylate is not particularly limited, and a known monofunctional polymerizable compound or polyfunctional polymerizable compound may be used.

Furthermore, the polymerizable compound contained in the ink composition of the present invention is preferably a radically polymerizable compound.

With regard to the ink composition of the present invention, it is preferable that at least 80 wt % of the polymerizable compounds contained therein are monofunctional polymerizable monomers (hereinafter, also called monofunctional radically polymerizable monomers) selected from the group consisting of monofunctional acrylates (monofunctional acrylic acid esters), monofunctional methacrylates (monofunctional methacrylic acid esters), monofunctional vinyloxy compounds, monofunctional N-vinyl compounds, monofunctional acrylamides, and monofunctional methacrylamides.

It is preferable for the polymerizable compounds such as tetrahydrofurfuryl acrylate contained in the ink composition of the present invention to all be monofunctional polymerizable compounds, that is, monofunctional polymerizable compounds only.

Furthermore, the molecular weight of the polymerizable compound is preferably no greater than 1,000, more preferably 50 to 800, and yet more preferably 60 to 500.

The ink composition of the present invention preferably comprises at least a cyclic monomer other than tetrahydrofurfuryl acrylate, more preferably comprises at least an N-vinyl group-containing cyclic monomer, and particularly preferably comprises an N-vinyllactam.

Monofunctional Cyclic Monomer Having N-Vinyl Group (Monofunctional N-vinyl Compound)

In the present invention, as a polymerizable monomer, it is preferable to use a monofunctional radically polymerizable monomer having an N-vinyl group and a ring structure. In particular, it is preferable to use N-vinylcarbazole, 1-vinylimidazole, or an N-vinyllactam, and it is more preferable to use an N-vinyllactam.

Preferred examples of the N-vinyllactam that can be used in the present invention include compounds represented by Formula (4) below.

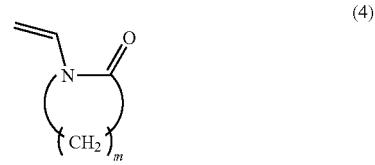

In Formula (4), m denotes an integer of 2 to 6.

In Formula (4) m is preferably an integer of 3 to 5 from the viewpoint of flexibility after the ink composition is cured, adhesion to a support, and availability of starting materials, m is more preferably 3 or 5, and m is particularly preferably 5, which is N-vinylcaprolactam. N-vinylcaprolactam is preferable since it has excellent safety, is commonly used and available at a relatively low price, and gives particularly good ink curability and adhesion of a cured coating to a support.

The N-vinyllactam such as represented by Formula (4) may have a substituent such as an alkyl group or an aryl group on the lactam ring, and may have a saturated or unsaturated ring structure bonded thereto.

The ink composition may contain only one compound of N-vinyllactams, or a combination of a plurality of compounds thereof.

The ink composition of the present invention preferably comprises the monofunctional cyclic monomer having N-vinyl group at 5 to 40 wt % of the total ink composition, more preferably 10 to 35 wt %, and yet more preferably 12 to 30 wt %.

In the above-mentioned range, an ink composition having good copolymerizability with tetrahydrofurfryl acrylate, excellent curability, and excellent anti-blocking properties is obtained.

The total content of tetrahydrofurfuryl acrylate and the N-vinyl group-containing monofunctional cyclic monomer in the ink composition of the present invention, relative to the total weight of the ink composition, is preferably at least 60 wt %, and more preferably 65 to 90 wt %. When in this range, the ink composition has appropriate viscosity, and it becomes possible to form a cured film that has high stretchability and can thus follow deformation, has excellent curing properties, does not scratch or stick to a mold when molding, does not cause cracking, image dropouts, etc., and has good abrasion properties.

In particular, in the ink composition of the present invention, the total content of tetrahydrofurfuryl acrylate and N-vinylcaprolactam, relative to the total weight of the ink composition, is particularly preferably at least 65 wt %, and most preferably 65 to 90 wt %.

The ink composition of the present invention preferably comprises the monofunctional cyclic monomer having N-vinyl group at 5 to 40 wt % of the total ink composition, more preferably 10 to 35 wt %, and yet more preferably 20 to 35 wt %.

When the amount of monofunctional N-vinyllactam used is in the above-mentioned range, the curability, the flexibility of a cured coating, and the adhesion to a support of a cured coating are excellent. The N-vinyllactam is a compound having a relatively high melting point. When the content of the N-vinyllactam is no greater than 40 wt %, good solubility is exhibited even at a low temperature of 0° C. or less, and the temperature range in which the ink composition can be handled widens.

(Monofunctional Radically Polymerizable Compound)

The ink composition of the present invention preferably comprises, of the polymerizable monomers, at least 80 wt % of a monofunctional polymerizable compound (also called a 'monofunctional radically polymerizable compound') selected from the group consisting of monofunctional acrylates (monofunctional acrylic acid esters), monofunctional methacrylates (monofunctional methacrylic acid esters), monofunctional vinyloxy compounds, monofunctional N-vinyl compounds, monofunctional acrylamides, and monofunctional methacrylamides.

Furthermore, the content of the monofunctional radically polymerizable monomer in the ink composition of the present invention, relative to the total weight of polymerizable compounds, is preferably 80 to 99 wt %, and more preferably 85 to 98 wt %.

When the content of the monofunctional radically polymerizable monomer is at least 80 wt %, a cured ink image has adequate flexibility and antiblocking properties.

As the monofunctional radically polymerizable compound, a (meth)acrylate compound having a cyclic structure or a (meth)acrylamide compound having a cyclic structure may be used.

Examples of the (meth)acrylate compound having a cyclic structure and the (meth)acrylamide compound having a cyclic structure include an ethylenically unsaturated compound represented by Formula (5) below.

(5)

wherein $R^1$ denotes a hydrogen atom or a methyl group.

$X^1$ denotes a first divalent linking group in which (—C(O)O—) or (—C(O)NH—) is bonded to the ethylenically unsaturated group shown in Formula (5), the first divalent linking group may be bonded to one second divalent linking group selected from the group consisting of a single bond, an ether bond (—O—), an ester bond (—C(O)O— or —OC(O)—), an amide bond (—C(O)NH— or —NHC(O)—), a carbonyl bond (—C(O)—), and an optionally branched alkylene group having no greater than 20 carbons or a group in which they are combined. It is preferable that $X^1$ is a first divalent linking group without a second divalent linking group and it is also preferable that a second divalent linking group has an ether bond or an ester bond and an alkylene group having not more than 20 carbons.

$R^2$ is a group having at least one cyclic structure, and the group having a cyclic structure denotes a aromatic group comprising a monocyclic aromatic group or a polycyclic aromatic group, or an alicyclic hydrocarbon group comprising a cycloalkane skeleton, an adamantane skeleton, or a norbornane skeleton. The ring structure of the aromatic group and the alicyclic hydrocarbon group may comprise a heteroatom such as O, N, or S.

Preferred examples of the aromatic group denoted by $R^2$ in Formula (5) include a phenyl group, which is monocyclic aromatic, and a polycyclic aromatic group having 2 to 4 rings; and specific preferred examples thereof include, but are not limited to, a naphthyl group, an anthryl group, a 1H-indenyl group, a 9H-fluorenyl group, a 1H-phenalenyl group, a phenanthrenyl group, a triphenylenyl group, a pyrenyl group, a naphthacenyl group, a tetraphenyl group, a biphenylenyl group, an as-indacenyl group, an s-indacenyl group, an acenaphthylenyl group, a fluoranthenyl group, an acephenanthrylenyl group, an aceanthrylenyl group, a chrysenyl group, and a pleiadenyl group.

These aromatic groups may be aromatic heterocyclic groups containing a heteroatom such as O, N, or S. Specific examples thereof include monocyclic aromatic heterocyclic groups such as a furyl group, a thienyl group, a 1H-pyrrolyl group, a 2H-pyrrolyl group, a 1H-pyrazolyl group, a 1H-imidazolyl group, an isooxazolyl group, an isothiazolyl group, a 2H-pyranyl group, a 2H-thiopyranyl group, a pyridyl group, a pyridazinyl group, a pyrimidinyl group, a pyrazinyl group, a 1,2,3-triazolyl group, and a 1,2,4-triazolyl group.

Examples further include polycyclic aromatic heterocyclic groups such as a thianthrenyl group, a benzofuranyl group, an isobenzofuranyl group, a chromenyl group, an isochromenyl group, 4H-chomenyl group, a xanthenyl group, a phenoxathiinyl group, an indolizinyl group, an isoindolyl group, an indolyl group, an indazolyl group, a purinyl group, a 4H-quinolizinyl group, an isoquinolyl group, a quinolyl group, a phthalazinyl group, a naphthyridinyl group, a quinoxalinyl group, a quinazolinyl group, a cinnolinyl group, a pteridinyl group, a carbazolyl group, a β-carbolinyl group, a phenanthridinyl group, an acridinyl group, a perimidinyl group, a phenanthrolinyl group, a phenazinyl group, a phenothiazinyl group, a phenoxazinyl group, and a pyrrolizinyl group.

The aromatic group may have one or more substituents such as a halogen atom, a hydroxyl group, an amino group, a mercapto group, a siloxane group, or a hydrocarbon group having no greater than 30 carbons. Two or more substituents of the aromatic group may form a ring structure containing a heteroatom such as O, N, or S as in, for example, phthalic anhydride or phthalimide.

Furthermore, $R^2$ in Formula (5) may be an alicyclic hydrocarbon group. Moreover, it may be a group having an alicyclic hydrocarbon group containing a heteroatom such as O, N, or S.

The alicyclic hydrocarbon group may be a group having a cycloalkane with 3 to 12 carbons.

Specific examples of the alicyclic hydrocarbon group containing a heteroatom such as O, N, or S include, a pyrrolidinyl group, a pyrazolidinyl group, an imidazolidinyl group, an isooxazolidinyl group, an isothiazolidinyl group, a piperidinyl group, a piperazinyl group, a morpholinyl group, and a thiomorpholinyl group.

These alicyclic hydrocarbon group and heteromonocycle-containing alicyclic hydrocarbon group may be substituted by a substituent and the substituent is preferably a halogen atom, a hydroxyl group, an amino group, a mercapto group, a siloxane group, an optionally substituted hydrocarbon group having a total of no greater than 30 carbons, or, as a divalent substituent, an oxy group (═O). Two or more substituents of the alicyclic hydrocarbon group may form a heterocyclic group containing a heteroatom such as O, N, or S.

Furthermore, R² in Formula (5) may be a group having an adamantane skeleton represented by Formula (1) below or an alicyclic hydrocarbon group having a norbornane skeleton represented by Formula (II).

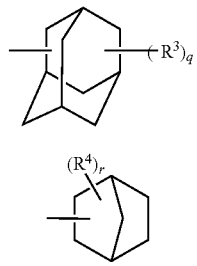

R³ and R⁴ in Formula (1) or Formula (II) independently denote a substituent, and may be bonded to any position of each alicyclic hydrocarbon structure. The q R³s and r R⁴s may be identical to or different from each other.

The q R³s and r R⁴s may independently be a monovalent or polyvalent substituent, and preferred examples of the monovalent substituent include a hydroxyl group, a substituted or unsubstituted amino group, a mercapto group, a siloxane group, or an optionally substituted hydrocarbon group or heterocyclic group having a total number of carbons of no greater than 30, and preferred examples of a divalent substituent include an oxy group (═O).

The substitution number q of R³ denotes an integer of 0 to 5, and the substitution number r of R⁴ denotes an integer of 0 to 5.

Furthermore, one carbon atom of the adamantane skeleton in Formula (1) may be replaced by a carbonyl bond (—C(O)—) and/or an ester bond (—C(O)O—), and one carbon atom of the norbornane skeleton in Formula (II) may be replaced by an ether bond (—O—) and/or an ester bond (—C(O)O—).

The norbornane skeleton represented by Formula (II) may have a cyclic hydrocarbon structure represented by Formula (III). n in Formula (III) denotes a cyclic hydrocarbon structure, the two ends of which may substitute any positions of the norbornane skeleton; it may be a monocyclic structure or a polycyclic structure and, moreover, it may comprise a carbonyl bond (—C(O)—) and/or an ester bond (—C(O)O—) in addition to a hydrocarbon bond in the cyclic hydrocarbon structure.

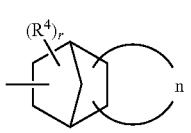

The ring structure represented by Formula (III) above is preferably a structure represented by Formula (IV), Formula (V), or Formula (VI).

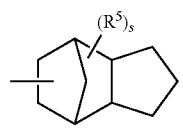

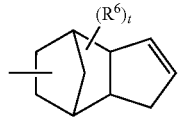

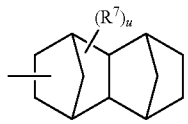

R⁵, R⁶, and R⁷ in Formula (IV), Formula (V), and Formula (VI) independently denote a substituent, s, t, and u independently denote an integer of 0 to 5, and the s R⁵ˢ, the t R⁶ˢ, and the u Fs may be identical to or different from each other.

X¹ in Formula (5) may be bonded to any position of each alicyclic hydrocarbon structure, shown below, in Formula (IV), Formula (V), or Formula (VI).

R⁵, R⁶ and R⁷ in Formula (IV), Formula (V), or Formula (VI) independently denote a substituent, and Formula (IV), Formula (V), or Formula (VI) may be bonded to any position on each of the alicyclic hydrocarbon structures below. The substituents denoted by R⁵, R⁶ and R⁷ have the same meanings as for the substituents denoted by R³ and R⁴ in Formula (I) to Formula (III), and preferred ranges are also the same.

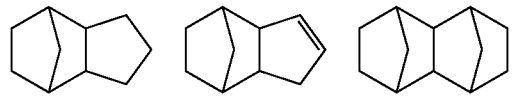

In the present invention, preferred examples of monofunctional acrylates, monofunctional methacrylates, monofunctional vinyloxy compounds, monofunctional acrylamides or monofunctional methacrylamides include monofunctional radically polymerizable compounds having a group with a ring structure such as a phenyl group, a naphthyl group, an anthracenyl group, a pyridinyl group, a tetrahydrofurfuryl group, a piperidinyl group, a cyclohexyl group, a cyclopentyl group, a cycloheptyl group, an isobornyl group, or a tricyclodecanyl group.

Preferred examples of the monofunctional radically polymerizable compound that can be used in the present invention include norbornyl (meth)acrylate, isobornyl (meth)acrylate, cyclohexyl (meth)acrylate, cyclopentyl (meth)acrylate, cycloheptyl (meth)acrylate, cyclooctyl (meth)acrylate, cyclodecyl (meth)acrylate, dicyclodecyl (meth)acrylate, trimethylcyclohexyl (meth)acrylate, 4-t-butylcyclohexyl (meth)acrylate, acryloylmorpholine, 2-benzyl (meth)acrylate, phenoxyethyl (meth)acrylate, phenoxydiethylene glycol (meth)acrylate, phenoxytriethylene glycol (meth)acrylate, ethylene oxide (EO) modified cresol (meth)acrylate, tetrahydrofurfuryl (meth)acrylate, caprolactone modified tetrahydrofurfuryl acrylate, nonylphenoxypolyethylene glycol (meth)acrylate, neopentyl glycol benzoate (meth)acrylate, paracumylphenoxyethylene glycol (meth)acrylate, N-phthalimidoethyl (meth)acrylate, pentamethylpiperidyl (meth)acrylate, tetramethylpiperidyl (meth)acrylate, N-cyclohexylacrylamide, N-(1,1-dimethyl-2-phenyl)ethylacrylamide, N-diphenylmethylacrylamide, N-phthalimidomethylacrylamide, N-(1,1'-dimethyl-3-(1,2,4-triazol-1-yl))propylacrylamide, and 5-(meth)acryloyloxymethyl-5-ethyl-1,3-dioxacyclohexane. Among them, phenoxyethyl acrylate is more preferable.

Specific preferred examples of the monofunctional radically polymerizable compound that can be used in the present invention are listed below as M-1 to M-56.

In some of the described chemical formulae in the present specification, a hydrocarbon chain is represented by a simplified structural formula in which symbols for carbon (C) and hydrogen (H) are omitted. Me denotes a methyl group.

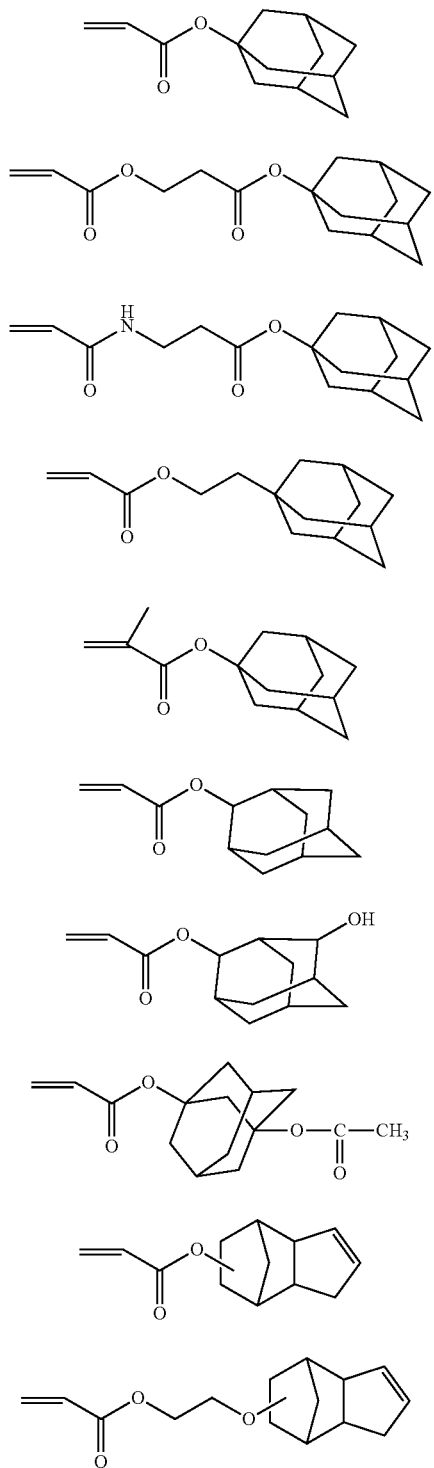

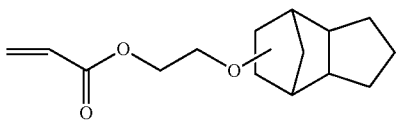
(M-11)

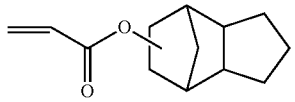
(M-12)

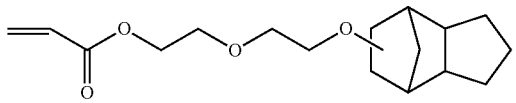
(M-13)

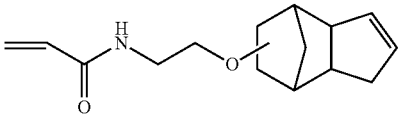
(M-14)

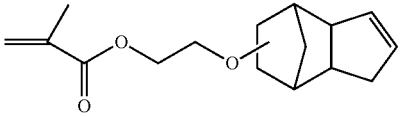
(M-15)

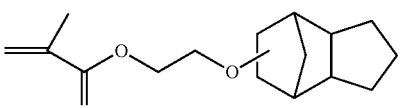
(M-16)

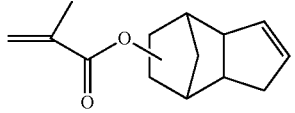
(M-17)

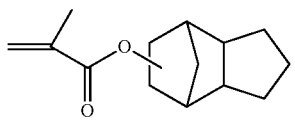
(M-18)

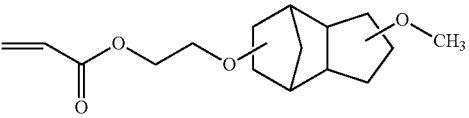
(M-19)

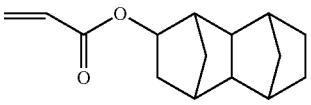
(M-20)

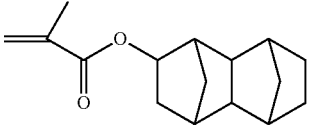
(M-21)

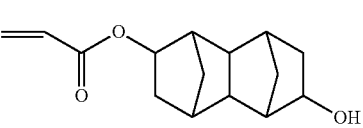
(M-22)

-continued
(M-23)
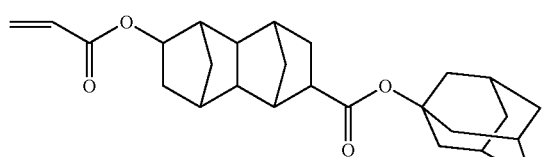
(M-24)
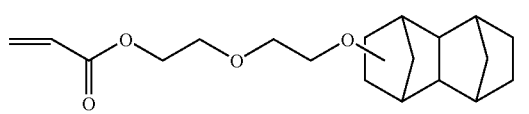
(M-25)
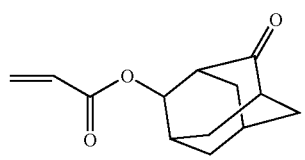
(M-26)
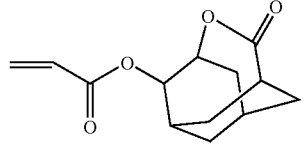
(M-27)
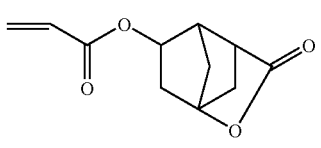
(M-28)
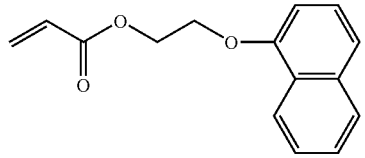
(M-29)
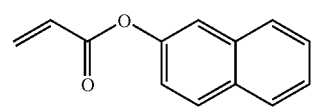
(M-30)
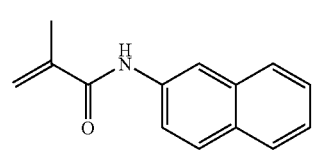
(M-31)
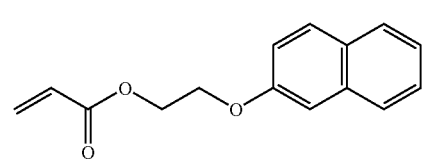
(M-32)
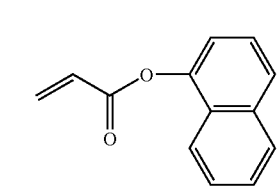
-continued
(M-33)
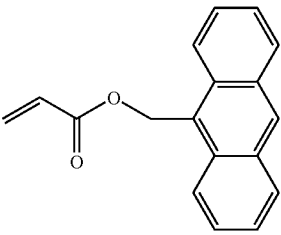
(M-34)
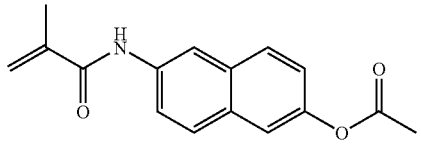
(M-35)
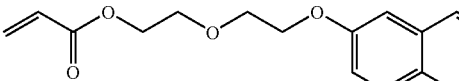
(M-36)
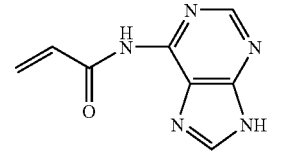
(M-37)
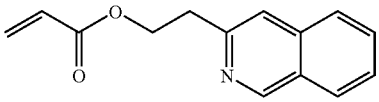
(M-38)
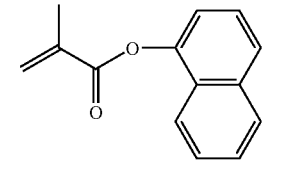
(M-39)
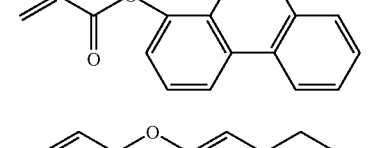
(M-40)
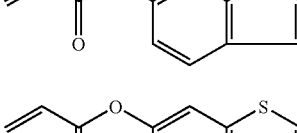
(M-41)
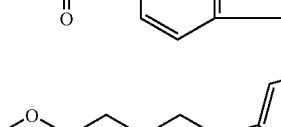
(M-42)
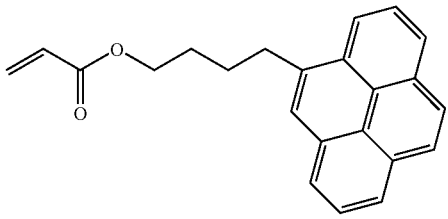

(M-43) 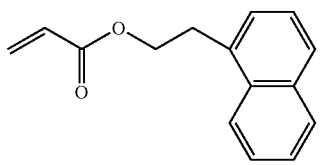

(M-44) 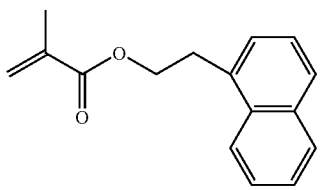

(M-45) 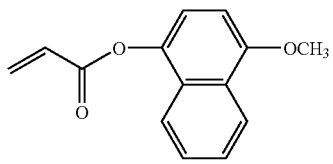

(M-46) 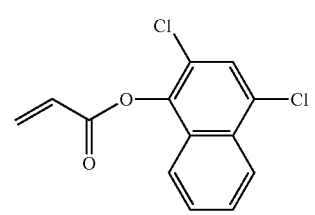

(M-47) 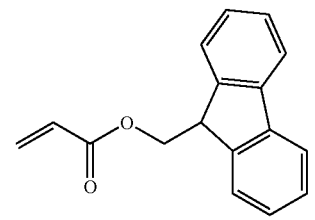

(M-48) 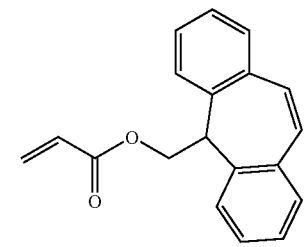

(M-49) 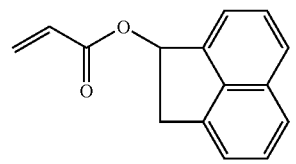

(M-50) 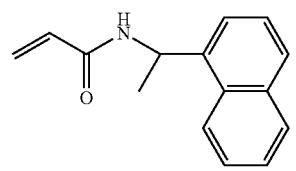

(M-51) 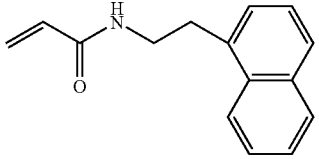

(M-52) 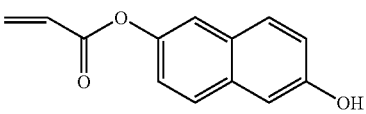

(M-53) 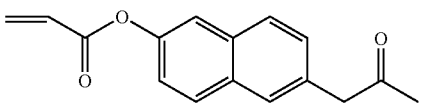

(M-54) 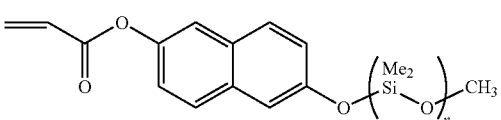

(M-55) 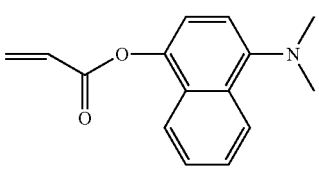

(M-56) 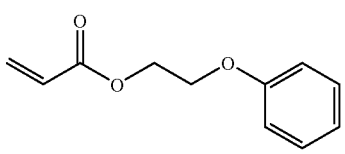

Acyclic Monofunctional Monomer

As the polymerizable compound, an acyclic monofunctional monomer may also be used.

The acyclic monofunctional monomer has a relatively low viscosity and may be used preferably for the purpose of, for example, decreasing the viscosity of the ink composition. However, from the viewpoint of suppressing the tackiness of a cured coating and giving a high coating strength so that scratches, etc. do not occur during molding, the proportion of the acyclic monofunctional monomer below in the total ink composition is preferably no greater than 20 wt %, and more preferably no greater than 15 wt %.

Specific examples include octyl (meth)acrylate, 2-ethylhexyl (meth)acrylate, decyl (meth)acrylate, dodecyl (meth)acrylate, tridecyl (meth)acrylate, tetradecyl (meth)acrylate, hexadecyl (meth)acrylate, 2-hydroxyethyl acrylate, butoxyethyl acrylate, carbitol acrylate, 2-ethylhexyl diglycol acrylate, polyethylene glycol (meth)acrylate monomethyl ether, polypropylene glycol (meth)acrylate monomethyl ether, and polytetraethylene glycol (meth)acrylate monomethyl ether.

Other than the above, examples also include acrylic acid derivatives such as (poly)ethylene glycol mono(meth)acrylate, (poly)ethylene glycol (meth)acrylate methyl ester, (poly)ethylene glycol (meth)acrylate ethyl ester, (poly)ethylene glycol(meth)acrylate phenyl ester, (poly)propylene glycol mono(meth)acrylate, (poly)propylene glycol mono (meth)acrylate phenyl ester, (poly)propylene glycol (meth)acrylate methyl ester, (poly)propylene glycol (meth)acrylate ethyl ester, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, 2-hydroxyethyl acrylate, butoxyethyl acrylate, tetrahydrofurfryl acrylate, benzyl acrylate, oligoester acrylate, N-methylolacrylamide, diacetone acrylamide, and epoxy acrylate.

Moreover, examples include methacrylic acid derivatives such as methyl methacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, allyl methacrylate, glicidyl methacrylate, benzyl methacrylate and dimethylaminomethyl methacrylate, and allyl compound derivatives such as allyl glycidyl ether.

Furthermore, examples include 2-ethylhexyl diglycol acrylate, 2-hydroxy-3-phenoxylpropyl acrylate, 2-hydroxybutyl acrylate, 2-acryloyloxyethylphthalic acid, 2-acryloyloxyethyl-2-hydroxyethylphthalic acid, ethoxylated phenyl acrylate, 2-acryloyloxyethylsuccinic acid, 2-acryloyloxyethylhexahydrophthalic acid, lactone-modified flexible acrylate, butoxyethyl acrylate, 2-hydroxyethyl acrylate, and methoxydipropylene glycol acrylate.

Polyfunctional Polymerizable Compound

As the polymerizable compound, a polyfunctional polymerizable monomer having two or more ethylenically unsaturated groups selected from the group consisting of an acryloyloxy group, a methacryloyloxy group, an acrylamide group, a methacrylamide group, a vinyloxy group, and an N-vinyl group may be used in combination as necessary. Another polyfunctional polymerizable compound may be used. By containing a polyfunctional polymerizable monomer, an ink composition having a high cured coating strength is obtained.

From the viewpoint of cured coating stretchability suitable for molding being maintained, the proportion of the polyfunctional polymerizable compound in the polymerizable compounds is preferably no greater than 20 wt % and more preferably no greater than 5 wt %, and it is especially preferable that no polyfunctional polymerizable compound other than the component (A) is contained.

Examples of the polyfunctional polymerizable compound having an ethylenically unsaturated bond include unsaturated carboxylic acids such as acrylic acid, methacrylic acid, itaconic acid, crotonic acid, isocrotonic acid, and maleic acid, and salts thereof, an ethylenically unsaturated group-containing anhydride, acrylonitrile, styrene and, furthermore, compounds that are (meth)acrylic acid esters and that have at least two ethylenically unsaturated groups, such as various types of unsaturated polyesters, unsaturated polyethers, unsaturated polyamides, unsaturated urethane (meth)acrylic-based monomers or prepolymers, epoxy-based monomers or prepolymers, and urethane-based monomers or prepolymers.

Specific examples thereof include methacrylic derivatives such as neopentyl glycol di(meth)acrylate, (poly)ethylene glycol di(meth)acrylate, (poly)tetramethylene glycol di(meth)acrylate, (poly)tetramethylene glycol di(meth)acrylate, bisphenol A PO adduct di(meth)acrylate, ethoxylated neopentyl glycol diacrylate, propoxylated neopentyl glycol diacrylate, bisphenol A EO adduct di(meth)acrylate, EO-modified pentaerythritol triacrylate, PO-modified pentaerythritol triacrylate, EO-modified pentaerythritol tetraacrylate, PO-modified pentaerythritol tetraacrylate, EO-modified dipentaerythritol tetraacrylate, PO-modified dipentaerythritol tetraacrylate, EO-modified trimethylolpropane triacrylate, PO-modified trimethylolpropane triacrylate, EO-modified tetramethylolmethane tetraacrylate, PO-modified tetramethylolmethane tetraacrylate, pentaerythritol triacrylate, pentaerythritol tetraacrylate, dipentaerythritol tetraacrylate, trimethylolpropane triacrylate, tetramethylolmethane tetraacrylate, trimethylolethane trimethacrylate, trimethylolpropane trimethacrylate, and 2,2-bis(4-methacryloxypolyethoxyphenyl)propane, allyl compound derivatives such as diallyl phthalate and triallyl trimellitate, 1,6-hexanediol diacrylate, 1,9-nonanediol diacrylate, 1,10-decanediol diacrylate, neopentyl glycol hydroxypivalate diacrylate, tetramethylolmethane triacrylate, dimethyloltricyclodecane diacrylate, modified glycerol triacrylate, bisphenol A diglycidyl ether acrylic acid adduct, modified bisphenol A diacrylate, dipentaerythritol hexaacrylate, pentaerythritol triacrylate, tolylene diisocyanate urethane prepolymer, pentaerythritol triacrylate hexamethylene diisocyanate urethane prepolymer, ditrimethylolpropane tetraacrylate, and pentaerythritol triacrylate hexamethylene diisocyanate urethane prepolymer and, more specifically, commercially available or industrially known radically polymerizable or crosslinking monomers, oligomers, and polymers, such as those described in 'Kakyozai Handobukku' (Crosslinking Agent Handbook), Ed. S. Yamashita (Taiseisha, 1981); 'UV/EB Koka Handobukku (Genryo)' (UV/EB Curing Handbook (Starting Materials)) Ed. K. Kato (Kobunshi Kankoukai, 1985); 'UV/EB Koka Gijutsu no Oyo to Shijyo' (Application and Market of UV/EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

Other specific examples of the polyfunctional monomer include bis(4-acryloxypolyethoxyphenyl)propane, neopentyl glycol di(meth)acrylate, 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, pentaerythritol triacrylate, pentaerythritol tetraacrylate, dipentaerythritol tetraacrylate, trimethylolpropane triacrylate, tetramethylolmethane tetraacrylate, tetramethylolmethane triacrylate, dimethyloltricyclodecane diacrylate, modified glycerol triacrylate, modified bisphenol A diacrylate, bisphenol A PO adduct diacrylate, bisphenol A EO adduct diacrylate, dipentaerythritol hexaacrylate, and caprolactone-modified dipentaerythritol hexaacrylate Vinyl Ether Compound Furthermore, as the radically polymerizable compound, it is preferable to use a vinyl ether compound. Examples of vinyl ether compounds that are suitably used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether, dodecyl vinyl ether, diethylene glycol monovinyl ether, octadecyl vinyl ether, ethylene glycol monovinyl ether, triethylene glycol monovinyl ether, hydroxyethyl monovinyl ether, and hydroxynonyl monovinyl ether.

Among these vinyl ether compounds, from the viewpoint of curability, adhesion, and surface hardness, divinyl ether compounds and trivinyl ether compounds are preferable, and divinyl ether compounds are particularly preferable. With regard to the vinyl ether compounds, one type thereof may be used on its own or two or more types thereof may be used in an appropriate combination.

The total weight of polymerizable compound in the ink composition in the present invention is preferably 55 to 95 wt %, and more preferably 60 to 90 wt %, relative to the total weight of the ink composition. When it is in the above-mentioned range, the curability is excellent, and the viscosity is appropriate.

(Colorant)

In the present invention, the ink composition may contain a colorant in order to improve the visibility of a formed image area.

The coloring agent (colorant) that can be used in the present invention is not particularly limited, but a pigment and an oil-soluble dye that have excellent weather resistance and rich color reproduction are preferable, and it may be selected from any known coloring agent such as a soluble dye. It is preferable that the coloring agent that can be suitably used in the ink composition or the inkjet recording ink composition of the present invention does not function as a polymerization inhibitor in a polymerization reaction, which is a curing reaction. This is because the sensitivity of the curing reaction by actinic radiation should not be degraded.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193; as a black pigment, Pigment Black 7, 28, or 26; as a white pigment, Pigment White 6, 18, or 21, etc. may be used according to the intended application.

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called water-insoluble pigment or an oil-soluble dye, and among these the oil-soluble dye is preferable.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Among the oil-soluble dyes that can be used in the present invention, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure.

Although not limited to the following, preferred specific examples thereof include CI Solvent Black 3, 7, 27, 29, and 34; CI Solvent Yellow 14, 16, 19, 29, 30, 56, 82, 93, and 162; CI Solvent Red 1, 3, 8, 18, 24, 27, 43, 49, 51, 72, 73, 109, 122, 132, and 218; CI Solvent Violet 3; CI Solvent Blue 2, 11, 25, 35, 38, 67, and 70; CI Solvent Green 3 and 7; and CI Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the present invention, the oil-soluble dye may be used singly or in a combination of two or more types.

Furthermore, when the oil soluble dye is used as a colorant, another colorant such as a water-soluble dye, a disperse dye, or a pigment may be contained as necessary in a range that does not interfere with the effects of the present invention.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent. Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

The colorant that can be used in the present invention is preferably added to the ink composition or the inkjet recording ink composition of the present invention and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition of the present invention, but in order to improve dispersibility it may be added in advance to a solvent or a dispersing medium such as a radically polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a radically polymerizable compound. As a polymerizable compound used, it is preferable in terms of dispersion suitability to select a monomer having the lowest viscosity.

These colorants may be used by appropriately selecting one type or two or more types according to the intended purpose of the ink composition.

When a colorant such as a pigment that is present as a solid in the ink composition of the present invention is used, it is preferable for the colorant, the dispersant, the dispersing medium, dispersion conditions, and filtration conditions to be set so that the average particle size of colorant particles is preferably 0.005 to 0.5 μm, more preferably 0.01 to 0.45 μm, and yet more preferably 0.015 to 0.4 μm. By such control of particle size, clogging of a head nozzle can be suppressed, and the ink storage stability, the ink transparency, and the curing sensitivity can be maintained.

The content of the colorant in the ink composition of the present invention is appropriately selected according to the color and the intended purpose, and is preferably 0.01 to 30 wt % relative to the weight of the entire ink composition.

In the present invention, with regard to the ratio by weight of the dispersant relative to the pigment, when the weight of the pigment in the ink composition is P and the weight of the dispersant in the ink composition is R, the ratio by weight (R/P) is $0.05 \leq R/P \leq 15$, preferably $0.1 \leq R/P \leq 10$, and more preferably $0.1 \leq R/P \leq 5$. When the ratio by weight of the dispersant relative to the pigment exceeds 0.5, after being stored over time there is no aggregation/precipitation of the pigment, the ink viscosity does not increase, and an ink composition having excellent storage stability over time can thus be obtained. Furthermore, when the ratio is 15 or less, an ink composition having a low ink viscosity and excellent discharge properties can be obtained.

(Dispersant)

The ink composition of the present invention comprises a dispersant in order to stably disperse the pigment in the ink composition.

As the dispersant that can be used in the present invention, a polymeric dispersant is preferable. The 'polymeric dispersant' referred to in the present invention means a dispersant having a weight-average molecular weight of 1,000 or greater.

Examples of the polymeric dispersant include polymeric dispersants such as DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (all manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (all manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Avecia); Adeka Pluronic L31, F38, L42, L44, L61, L64, F68, L72, P95, F77, P84, F87, P94, L101, P103, F108, L121, and P-123 (manufactured by Adeka Corporation), Isonet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant in the ink composition of the present invention is appropriately selected according to the intended purpose, and is generally preferably 0.05 to 15 wt % relative to the weight of the entire ink composition.

(Other Component)

The ink composition of the present invention may comprise another component as necessary.

Examples of the other component include a sensitizer, a cosensitizer, another polymerizable compound, a surfactant, a UV absorber, an antioxidant, an antifading agent, a conductive salt, a solvent, a polymer compound, and a basic compound.

Sensitizer

The ink composition of the present invention may contain a sensitizer in order to promote decomposition of the above-mentioned polymerization initiator by absorbing specific actinic radiation, in particular when used for inkjet recording. The sensitizer absorbs specific actinic radiation and attains an electronically excited state. The sensitizer in the electronically excited state causes actions such as electron transfer, energy transfer, or heat generation upon contact with the polymerization initiator. This causes the polymerization initiator to undergo a chemical change and decompose, thus forming a radical, an acid, or a base.

As a sensitizer in the ink composition of the present invention, it is preferable to use a sensitizing dye.

Preferred examples of the sensitizing dye include those that belong to compounds below and have an adsorption wavelength in the region of 350 nm to 450 nm.

Polynuclear aromatic compounds (e.g. pyrene, perylene, triphenylene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

More preferred examples of the sensitizing dye include compounds represented by Formulae (IX) to (XIII) below.

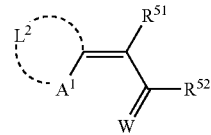

(IX)

In Formula (IX), $A^1$ denotes a sulfur atom or $NR^{50}$, $R^{50}$ denotes an alkyl group or an aryl group, $L^2$ denotes a non-metallic atomic group forming a basic nucleus of a dye in cooperation with a neighboring $A^1$ and the neighboring carbon atom, $R^{51}$ and $R^{52}$ independently denote a hydrogen atom or a monovalent non-metallic atomic group, and $R^{51}$ and $R^{52}$ may be bonded together to form an acidic nucleus of a dye. W denotes an oxygen atom or a sulfur atom.

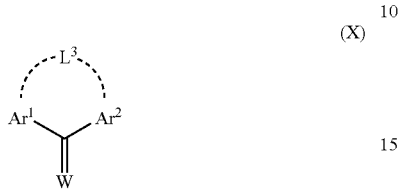

(X)

In Formula (X), $Ar^1$ and $Ar^2$ independently denote an aryl group and are connected to each other via a bond of -$L^3$-. Here, $L^3$ denotes —O— or —S—. W has the same meaning as that shown in Formula (IX).

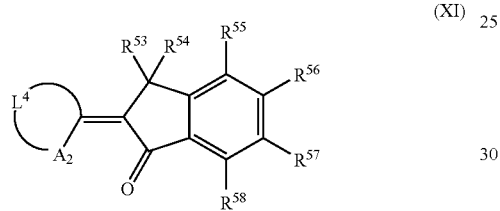

(XI)

In Formula (XI), $A_2$ denotes a sulfur atom or $NR^{59}$, $L^4$ denotes a non-metallic atomic group forming a basic nucleus of a dye in cooperation with the neighboring $A_2$ and carbon atom, $R^{53}$, $R^{54}$, $R^{55}$, $R^{56}$, $R^{57}$, and $R^{58}$ independently denote a monovalent non-metallic atomic group, and $R^{59}$ denotes an alkyl group or an aryl group.

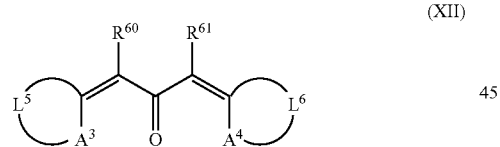

(XII)

In Formula (XII), $A^3$ and $A^4$ independently denote —S—, —$NR^{62}$—, or —$NR^{63}$—, $R^{62}$ and $R^{63}$ independently denote a substituted or unsubstituted alkyl group, or a substituted or unsubstituted aryl group, $L^5$ and $L^6$ independently denote a non-metallic atomic group forming a basic nucleus of a dye in cooperation with the neighboring $A^3$ and $A^4$ and neighboring carbon atom, and $R^{60}$ and $R^{61}$ independently denote a hydrogen atom or a monovalent non-metallic atomic group, or are bonded to each other to form an aliphatic or aromatic ring.

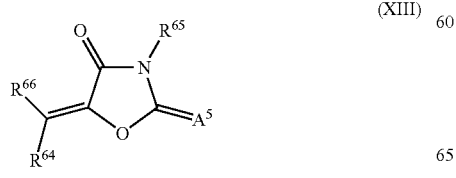

(XIII)

In Formula (XIII), $R^{66}$ denotes an aromatic ring or a hetero ring, which may have a substituent, and $A^5$ denotes an oxygen atom, a sulfur atom, or —$NR^{67}$—. $R^{64}$, $R^{65}$, and $R^{67}$ independently denote a hydrogen atom or a monovalent non-metallic atomic group, and $R^{67}$ and $R^{64}$, and $R^{65}$ and $R^{67}$ may be bonded to each other to form an aliphatic or aromatic ring.

Specific examples of the compounds represented by Formulae (IX) to (XIII) include (E-1) to (E-20) listed below.

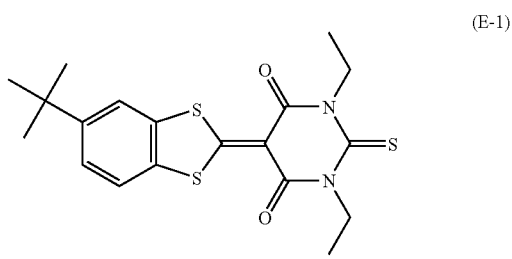

(E-1)

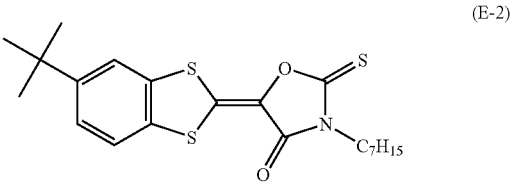

(E-2)

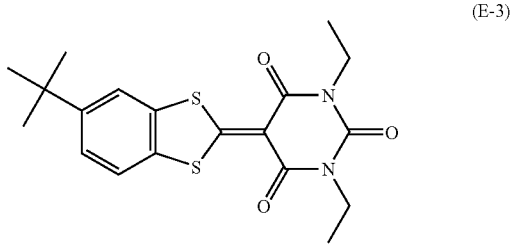

(E-3)

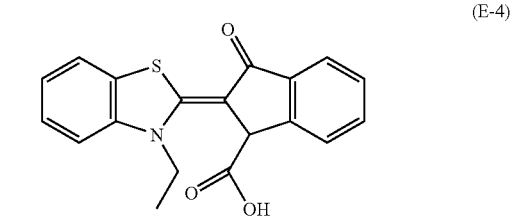

(E-4)

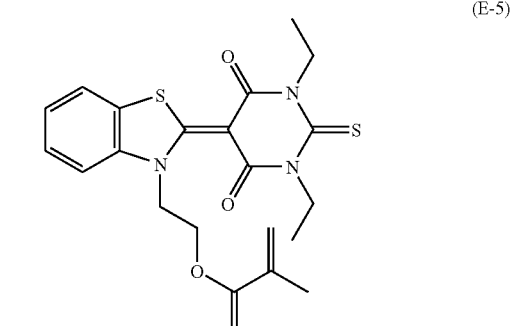

(E-5)

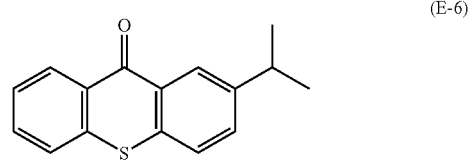

(E-6)

-continued

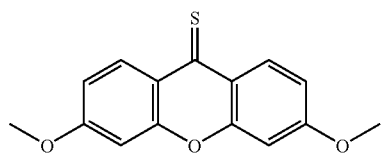
(E-7)

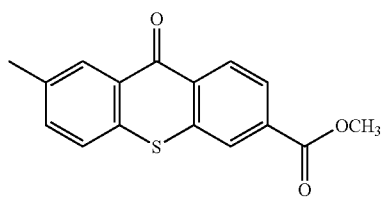
(E-8)

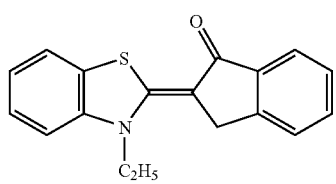
(E-9)

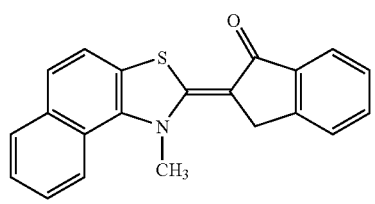
(E-10)

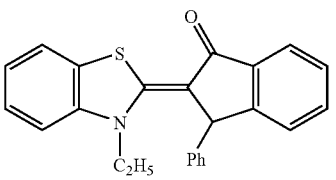
(E-11)

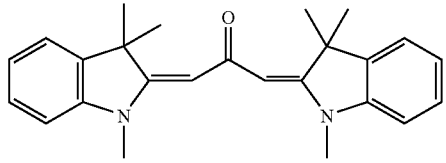
(E-12)

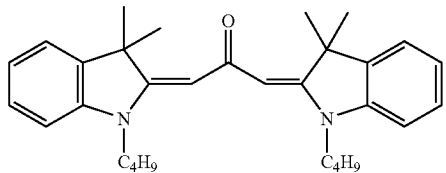
(E-13)

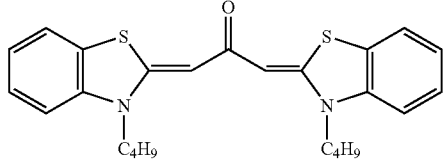
(E-14)

-continued

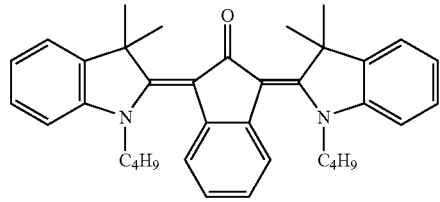
(E-15)

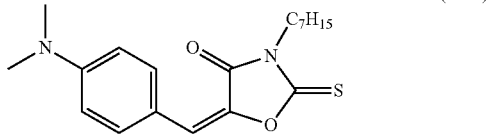
(E-16)

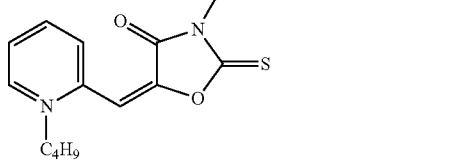
(E-17)

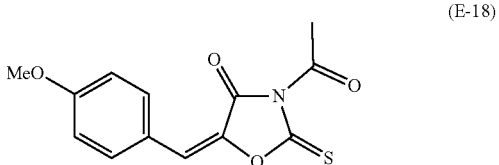
(E-18)

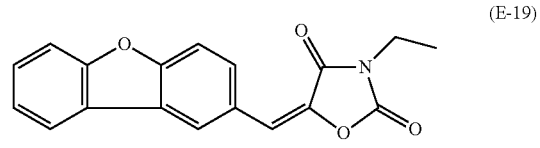
(E-19)

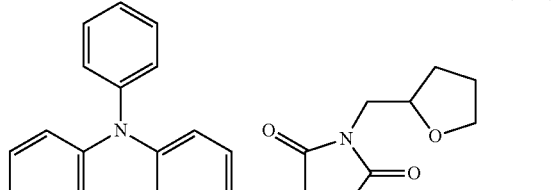
(E-20)

The content of the sensitizer in the ink composition of the present invention is appropriately selected according to the intended purpose, but it is generally preferably 0.05 to 4 wt % relative to the weight of the entire ink composition.

Cosensitizer

The ink composition of the present invention preferably comprises a cosensitizer (the 'co-sensitizer' is also called a 'supersensitizer'). In the present invention, the cosensitizer has the function of further improving the sensitivity of the sensitizing dye to actinic radiation or the function of suppressing inhibition by oxygen of polymerization of a polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

The content of the cosensitizer in the ink composition of the present invention is appropriately selected according to the intended purpose, but it is generally preferably 0.05 to 4 wt % relative to the weight of the entire ink composition.

Surfactant

A surfactant may be added to the ink composition that can be used in the present invention in order to impart long-term discharge stability.

As the surfactant, those described in JP-A-62-173463 and JP-A-62-183457 can be cited. Examples thereof include anionic surfactants such as dialkylsulfosuccinic acid salts, alkylnaphthalene sulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts.

UV Absorber

A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the ink composition.

Antioxidant

In order to improve the stability of the ink composition, an antioxidant may be added. Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably on the order of 0.1 to 8 wt % on the basis of the solids content in the ink composition.

Antifading Agent

The ink composition of the present invention may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-21572, pages 127 to 137.

The amount thereof added is appropriately selected according to the intended application, and it is preferably 0.1 to 8 wt % on the basis of the solids content in the ink composition.

Conductive Salt

The ink composition of the present invention may contain, for the purpose of controlling discharge properties, a conductive salt such as potassium thiocyanate, lithium nitrate, ammonium thiocyanate, or dimethylamine hydrochloride.

Solvent

It is also effective to add a trace amount of organic solvent to the ink composition of the present invention in order to improve the adhesion to a recording medium.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or VOC, and the amount is preferably in the range of 0.1 to 5 wt % relative to the total amount of the ink composition, and more preferably 0.1 to 3 wt %.

High Molecular Weight Compound

The ink composition may contain various types of high molecular weight compounds in order to adjust film physical properties. Examples of the high molecular weight compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinylic resins, acrylic resins, rubber-based resins, waxes, and other natural resins. They may be used in a combination of two or more types. Among these, a acrylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

Basic Compound

The basic compound is preferably added from the viewpoint of improving the storage stability of the ink composition. A basic compound that can be used in the present invention is a known basic compound, and preferred examples thereof include a basic inorganic compound such as an inorganic salt or a basic organic compound such as an amine.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth)acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Properties of Ink

The ink composition of the present invention has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink into the recording medium can be prevented, and uncured monomer can be reduced. Furthermore, ink spreading when ink droplets have landed can be suppressed, and as a result there is the advantage that the image quality is improved.

The surface tension of the ink composition of the present invention at 25° C. is preferably 20 to 35 mN/m, and more preferably 23 to 33 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 35 mN/m.

(2) Inkjet Recording Method, Inkjet Recording Device, and Process for Producing a Formed Printed Material The ink composition of the present invention is suitably used for inkjet recording.

The inkjet recording method of the present invention is a method for forming an image by discharging the ink composition of the present invention onto a recording medium (support, recording material, etc.) for inkjet recording and curing the ink by irradiating the ink composition so discharged onto the recording medium with actinic radiation.

More particularly, the inkjet recording method of the present invention comprises ($a^1$) a step of discharging the ink composition of the present invention onto a recording medium and ($b^1$) a step of curing the ink composition by irradiating the ink composition so discharged with actinic radiation, The inkjet recording method of the present invention comprises the steps ($a^1$) and ($b^1$) above and thus forms an image from the ink composition cured on the recording medium.

The printed material of the present invention is a printed material recorded by the inkjet recording method of the present invention.

Furthermore, the ink composition of the present invention is suitably used when forming an image by an inkjet method on a support that is subjected to molding. By molding a printed material obtained by the inkjet recording method, a formed printed material can be produced.

More particularly, the process for producing a formed printed material of the present invention comprises ($a^2$) a step of forming an image by discharging the ink composition of the present invention onto a support by an inkjet method, ($b^2$) a step of irradiating the image thus obtained with actinic radiation so as to cure the ink composition and obtain a printed material having the image cured on the support, and ($c^2$) a step of molding the printed material. The molding is preferably embossing, vacuum forming, pressure forming, vacuum/pressure forming, or hole making.

Recording Medium and Support

In the present invention, the recording medium is not particularly limited, and a recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

A support that can be used in the present invention is not particularly limited, but in the case of molding a printed material, a known recording medium described below may be used.

Examples of the support include polyolefin-based resins such as polyethylene, polypropylene, polymethylpentene, polybutene, and an olefin-based thermoplastic elastomer, polyester resins such as polyethylene terephthalate, polybutylene terephthalate, polyethylene naphthalate, a terephthalic acid-isophthalic acid-ethylene glycol copolymer, a terephthalic acid-ethylene glycol-1,4-cyclohexanedimethanol copolymer, and a polyester-based thermoplastic elastomer, polyamide resins such as nylon-6, nylon-9, and nylon-66, fluorine-based resins such as polyvinyl fluoride, polyvinylidene fluoride, polyvinylidene trifluoride, an ethylene-ethylene tetrafluoride copolymer, and polyethylene tetrafluoride, an acrylic-based resin, polyvinyl chloride, polystyrene, and a polycarbonate resin.

With regard to the acrylic-based resin, for example, a resin such as polymethyl (meth)acrylate, polyethyl (meth)acrylate, polybutyl (meth)acrylate, a methyl (meth)acrylate-butyl (meth)acrylate copolymer, an ethyl (meth)acrylate-butyl (meth)acrylate copolymer, or a methyl (meth)acrylate-styrene copolymer (the term (meth)acrylate means acrylate or methacrylate) may be used singly or in a combination of two or more types. In particular, from the viewpoint of molding being easy and various resistance properties of a finished formed printed material being excellent, it is preferable to use polyethylene terephthalate, a polycarbonate resin, or a resin formed by blending a polycarbonate resin with another resin.

The thickness of a thermoplastic resin sheet used as the support for molding in the present invention (the total thickness in the case of a laminate structure) is not particularly limited as long as it is a resin sheet having a thickness in a range that allows vacuum and pressure forming employing the principles of embossing, vacuum forming, pressure forming, and vacuum/pressure forming to be carried out, and it is preferably 50 to 1,000 μm, more preferably 70 to 800 μm, and yet more preferably 100 to 500 μm.

It is appropriately selected from thermoplastic resin sheets while taking into consideration suitability for embossing in terms of giving a high gloss region, a low gloss region, and a variation in sheet thickness and, moreover, a balance between molding suitability and embossing durability (preventing disappearance of embossing) due to heat during molding when a printed material is thermally softened and formed by vacuum forming, etc. The layer structure of a transparent resin substrate sheet may be a single layer or a laminate in which two or more layers of different types of resin are laminated.

It is possible to add an appropriate additive to the thermoplastic resin sheets as necessary. As the additive, various types of additive may be added in an appropriate amount such that they do not impair surface gloss or thermal behavior such as melting point. Examples thereof include a photostabilizer such as a benzotriazole-based, benzophenone-based, etc. UV absorber or a hindered amine-based radical scavenger, a lubricant such as a silicone resin or a wax, a colorant, a plasticizer, a heat stabilizer, an antimicrobial agent, an antimold agent, and an antistatic agent.

The formed printed material in the present invention may be produced by subjecting the thermoplastic resin sheet to vacuum molding, etc., and an image is formed on the support by the inkjet method prior to molding. An image is generally formed on the reverse side of a transparent sheet (side facing the mold in vacuum molding), but an image may also be formed on the opposite side. It is also possible to form an image only on said opposite side depending on the circumstances, and in this case the thermoplastic resin sheet used as a substrate is not necessarily transparent.

In the step ($a^1$) and ($b^1$) in the inkjet recording method of the present invention, an inkjet recording device described in detail below may be used.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink onto a recording medium (support) in step ($a^1$) of the inkjet recording method and step ($a^2$) of the process for producing a formed printed material of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink supply tank immediately before an inkjet head, a filter, and a piezo system inkjet head. The piezo system inkjet head may be driven so as to discharge a multisize dot of preferably 1 to 100 pL, and more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, since it is desirable for the radiation curing type ink to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since a good discharge stability can be obtained. By employing this method, high discharge stability can be realized.

The radiation curing type ink composition such as the ink composition of the present invention generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink discharge temperature as constant as possible. In the present invention, the control range for the temperature is preferably ±5° C. of a set temperature, more preferably ±2° C. of the set temperature, and yet more preferably ±1° C. of the set temperature.

The step ($b^1$) of curing the discharged ink composition by irradiating the ink composition with actinic radiation, and the step ($b^2$) of irradiating the image thus obtained with actinic radiation so as to cure the ink composition and obtain a printed material having the image cured on the support are explained.

The ink composition discharged onto the recording medium or onto the support cures upon exposure to actinic radiation. This is due to a initiating species such as a radical being generated by decomposition of the radical polymerization initiator contained in the ink composition of the present invention by irradiation with actinic radiation, the initiating species functioning so as to make a polymerization reaction of a radically polymerizable compound take place and to promote it. In this process, if a sensitizing colorant is present together with the polymerization initiator in the ink composition, the sensitizing colorant in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is, for example, 200 to 600 nm, preferably 300 to 450 nm, and more preferably 350 to 420 nm.

Furthermore, in the present invention, the polymerization initiation system has sufficient sensitivity for low output actinic radiation. The actinic radiation is applied therefore so that the illumination intensity on the exposed surface is, for example, 10 to 4,000 mW/cm$^2$, and preferably 20 to 2,500 mW/cm$^2$.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The ink composition of the present invention is desirably exposed to such actinic radiation for, for example, 0.01 to 120 sec., and preferably 0.1 to 90 sec.

Irradiation conditions and a basic method for irradiation with actinic radiation are disclosed in JP-A-60-132767. Specifically, a light source is provided on either side of a head unit that includes an ink discharge device, and the head unit and the light source are made to scan by a so-called shuttle system. Irradiation with actinic radiation is carried out after a certain time (e.g. 0.01 to 0.5 sec., preferably 0.01 to 0.3 sec., and more preferably 0.01 to 0.15 sec.) has elapsed from when the ink has landed. By controlling the time from ink landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light, and such a curing method may be applied to the inkjet recording method and the process for producing a formed printed material of the present invention.

By employing such a method as described above, it is possible to maintain a uniform dot diameter for landed ink composition even for various types of recording media (support) having different surface wettability, thereby improving the image quality. In order to obtain a color image, it is preferable to superimpose colors in order from those with a low lightness. By superimposing inks in order from one with low lightness, it is easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

Ink Set

The inkjet recording method and the process for producing a formed printed material of the present invention may suitably employ the ink set comprising at least one ink composition of the present invention. The order in which colored ink compositions are discharged is not particularly limited, but it is preferable to apply to a recording medium from a colored ink composition having a low lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta, cyan, magenta, black, white, and yellow dark ink compositions may preferably be used, and in this case they are applied on top of the recording medium in the order white→light cyan→light magenta→yellow→cyan→magenta→black.

In this way, the ink composition of the present invention is cured by irradiation with actinic radiation in high sensitivity to thus form an image on the surface of the recording medium.

When using as an ink set comprising plurality of ink compositions having a different color, the ink set is not particularly limited as long as it is an ink set having two or more types of ink compositions in combination, the ink set comprising in combination at least one ink composition of the present invention and another ink composition of the present invention or an ink composition other than one of the present invention, and it is preferable for the ink set to comprise at least one ink composition of the present invention having a color selected from cyan, magenta, yellow, black, white, light magenta, and light cyan.

Furthermore, the ink set of the present invention may be suitably used in the inkjet recording method of the present invention.

In order to obtain a full color image using the ink composition of the present invention, it is preferable to use, as the ink set of the present invention, an ink set comprising at least four dark ink compositions of yellow, cyan, magenta, and black, it is more preferable to use an ink set comprising in combination five dark ink compositions of yellow, cyan, magenta, black, and white and at least one ink composition of the present invention, and it is yet more preferable to use an ink set comprising in combination five dark ink compositions of yellow, cyan, magenta, black, and white and two, that is, light cyan, and light magenta ink compositions.

The 'dark ink composition' referred to in the present invention means an ink composition for which the content of the colorant exceeds 1 wt % of the entire ink composition. The colorant is not particularly limited; a known colorant may be used, and examples thereof include a pigment and an oil-soluble dye.

The dark ink composition and the light ink composition employ colorants of similar colors, the ratio of the colorant concentration of the dark ink composition to the colorant concentration of the light ink composition is preferably dark ink composition:light ink composition=15:1 to 4:1, more preferably 12:1 to 4:1, and yet more preferably 10:1 to 4.5:1. When the ratio is in the above-mentioned range, a vivid full color image with little feeling of grain can be obtained.

Forming

The printed material formed by employing the ink composition of the present invention is suitable for forming processing by embossing, vacuum forming, pressure forming, vacuum/pressure forming, or hole making. As a system for forming a printed material, a known system may be used, and the system may be integral with the inkjet recording system or separate therefrom.

Embossing

Embossing is a process in which a three-dimensional feel is given by indenting a printed material, etc. in a desired shape such as a pattern or a letter, and may be carried out using a roller, a press, etc.

Examples of embossing include a hot/cold pressing method, and a method described in JP-A-10-199360, etc. may be referred to.

One example of an embossing system employing the hot/cold pressing method is shown below.

In the embossing system, a lower platen and an upper platen are disposed so that they can move toward and away from each other. A plate-shaped heater is fixed on top of the lower platen, and a plate-shaped heater is also fixed to a lower face of the upper platen. This enables a support to be hot pressed while it is heated. In this hot pressing machine, the plate-shaped heater on the lower platen is equipped with a mold having a projection following a predetermined embossing shape, and a mold having a recess that conforms to the shape of the projection is mounted so as to be in contact with the heater fixed to the lower face of the upper platen. A support having an image formed thereon is positioned, a cushion sheet is placed between the support and the mold with the recess, and the support and the cushion sheet are pressed between the upper platen and the lower platen by lowering the upper platen, etc. A pressure applied in this hot pressing step is, for example, 30 tons, and the heating temperature from the plate-shaped heater is, for example, 170° C. The upper platen is pressed against the lower platen, the support and the cushion sheet are sandwiched between the molds, and this hot pressing is maintained for about 3 minutes. The support is heated by the heaters via the molds, and a plurality of projections are formed due to thermal deformation. Subsequently, the support and the cushion sheet sandwiched between the molds are subjected to cold pressing by placing them between internally water-cooled platens without heaters and applying a pressure of, for example, 30 tones by pressing the platens for about 3 minutes. This enables an embossed formed printed material to be obtained in which the support has a projecting shape due to thermal deformation by the hot pressing. The pressure applied and the heating temperature may be adjusted appropriately according to the material of the printed material and conditions such as the shape that is to be formed, etc.

When the printed material formed using the ink composition of the present invention is embossed, it is preferable to carry out embossing at 20° C. to 150° C., more preferably 20° C. to 100° C., and particularly preferably 25° C. to 60° C. In the above-mentioned range, it is possible to carry out processing in which there is little change in the color of the image and release from a mold is excellent.

Vacuum Molding, Pressure Molding, and Vacuum/Pressure Molding

Vacuum molding is a method in which a support having an image formed thereon is preheated to a temperature at which it can be thermally deformed, and molding is carried out by pressing it against a mold and cooling while sucking it toward the mold by means of vacuum and stretching it; pressure molding is a method in which a support having an image formed thereon is preheated to a temperature at which it can be thermally deformed, and molding is carried out by pressing it against a mold by applying pressure from the side opposite to the mold and cooling. Vacuum/pressure molding is a method in which molding is carried out by applying a vacuum and pressure at the same time.

In detail, the 'Thermal Molding' section described on p. 766 to 768 of 'Kobunshi Daijiten' (Polymer Dictionary) (Maruzen) and publications cited in the section may be referred to. The processing temperature is appropriately selected depending on the type of the support, and it is preferable to carry out molding when the support temperature is 60° C. to 180° C., more preferably 80° C. to 160° C., and yet more preferably 80° C. to 150° C. In the above-mentioned range, it is possible to carry out processing in which there is little change in the color of the image and release from a mold is excellent.

Hole Making

The hole making referred to here is a process in which a hole of any shape such as a pattern or a character is made in a printed material, etc., and there are methods involving punching using a conventionally known press, etc., hole making using a drill, etc., and hole making using a laser. Among them, punching using a press, etc. is suitable when molding a large number of products of the same kind.

Punching using a press, etc. is a method in which a printed material placed on a mold is subjected to shearing using a press equipped with a punching blade.

When a printed material formed using the ink composition of the present invention is subjected to hole making, it is preferably carried out at a temperature of 20° C. to 150° C., more preferably 20° C. to 100° C., and particularly preferably 25° C. to 60° C. When in the above-mentioned range, processing is possible while suppressing change in color of the image and enabling excellent mold release properties to be exhibited.

EXAMPLES

The present invention is explained in further detail by reference to Examples and Comparative Examples. However, the present invention should not be construed as being limited to these Examples.

'Parts' described below means 'parts by weight' unless otherwise specified.

Starting materials of the ink compositions (radically polymerizable compositions) used in the Examples below are as follows.

IRGALITE BLUE GLVO (cyan pigment, manufactured by Ciba Specialty Chemicals)

CINQUASIA MAGENTA RT-335-D (magenta pigment, manufactured by Ciba Specialty Chemicals)

NOVOPERM YELLOW H2G (yellow pigment, manufactured by Clariant)

SPECIAL BLACK 250 (black pigment, manufactured by Ciba Specialty Chemicals)

Tipaque CR 60-2 (white pigment, manufactured by Ishihara Sangyo Kaisha Ltd.)

N-Vinylcaprolactam (NVC, manufactured by BASF)

FANCRYL FA-512A (dicyclopentenyloxyethyl acrylate, manufactured by Hitachi Chemical Co., Ltd.)

FANCRYL FA-513AS (dicyclopentanyl acrylate, manufactured by Hitachi Chemical Co., Ltd.)

SR9003 (propylene glycol-modified neopentyl glycol diacrylate, manufactured by Sartomer Japan Inc.)

SR506 (isobornyl acrylate, manufactured by Sartomer Co., Inc.)

SOLSPERSE 32000 (dispersant, manufactured by Lubrizol Co., Ltd.)

SOLSPERSE 36000 (dispersant, manufactured by Lubrizol Co., Ltd.)

DISPERBYK-168 (polymeric dispersant, solids content 30%, manufactured by BYK Chemie GmbH)

tetrahydrofurfryl acrylate (SR285, Sartomer Co., Inc.)

RAPI-CURE DVE-3 (triethylene glycol divinyl ether, manufactured by ISP Europe)

NK Ester AMP-10G (PEA, phenoxyethyl acrylate, manufactured by Shin-Nakamura Chemical Co., Ltd.)
FIRSTCURE ST-1 (polymerization inhibitor, manufactured by Chem First Inc.)
IRGACURE 819 (polymerization initiator, bis(2,4,6-trimethylbenzoyl)phenylphosphine oxide, manufactured by Ciba Specialty Chemicals Inc.)
IRGACURE 184 (polymerization initiator, 1-hydroxy-cyclohexyl-phenyl-ketone, manufactured by Ciba Specialty Chemicals Inc.)
Darocur (Lucirin) TPO (polymerization initiator, 2,4,6-trimethylbenzoyldiphenylphosphine oxide, manufactured by Ciba Specialty Chemicals Inc.)
Benzophenone (photopolymerization initiator, manufactured by Wako Pure Chemic al Industries, Ltd.)
FIRSTCURE ITX (Isopropylthioxanthone, manufactured by ChemFirst Inc.)
SARTOMER $CN_3O_7$ (polybutadiene diacrylate, manufactured by Sartomer Japan Inc.)
NISSO-PB B-1000 (polybutadiene, manufactured by Nippon Soda Co., Ltd., Number average molecular weight: 900 to 1,300)

Preparation of Cyan Mill Base A 300 parts by weight of IRGALITE BLUE GLVO, 600 parts by weight of tetrahydrofurfryl acrylate, and 100 parts by weight of SOLSPERSE 3200 were stirred and mixed to give a pigment mill base. As for the preparation of the mill base, the components were put into an M50 disperser motor mill (manufactured by Eiger Machinery, Inc.) to be dispersed using zirconia beads having a diameter of 0.65 mm at a peripheral speed of 9 m/s for 4 hours.

Preparation of Magenta Mill Base B 300 parts by weight of CINQUASIA MAGENTA RT-335-D, 600 parts by weight of tetrahydrofurfryl acrylate, and 100 parts by weight of SOLSPERSE 3200 were stirred and mixed to give a pigment mill base. As for the preparation of the mill base, the components were put into an M50 disperser motor mill (manufactured by Eiger Machinery, Inc.) to be dispersed using zirconia beads having a diameter of 0.65 mm at a peripheral speed of 9 m/s for 10 hours.

Preparation of Yellow Mill Base C 300 parts by weight of NOVOPERM YELLOW H2G, 600 parts by weight of tetrahydrofurfryl acrylate, and 100 parts by weight of SOLSPERSE 3200 were stirred and mixed to give a pigment mill base. As for the preparation of the mill base, the components were put into an M50 disperser motor mill (manufactured by Eiger Machinery, Inc.) to be dispersed using zirconia beads having a diameter of 0.65 mm at a peripheral speed of 9 m/s for 10 hours.

Preparation of Black Mill Base D 300 parts by weight of SPECIAL BLACK 250, 600 parts by weight of tetrahydrofurfryl acrylate, and 100 parts by weight of SOLSPERSE 3200 were stirred and mixed to give a pigment mill base. As for the preparation of the mill base, the components were put into an M50 disperser motor mill (manufactured by Eiger Machinery, Inc.) to be dispersed using zirconia beads having a diameter of 0.65 mm at a peripheral speed of 9 m/s for 7 hours.

Preparation of White Mill Base E 500 parts by weight of Tipaque CR-60-2, 450 parts by weight of tetrahydrofurfryl acrylate, and 50 parts by weight of SOLSPERSE 3600 were stirred and mixed to the give a pigment mill base. As for the preparation of the mill base, the components were put into an M50 disperser motor mill (manufactured by Eiger Machinery, Inc.) to be dispersed using zirconia beads having a diameter of 0.65 mm at a peripheral speed of 9 m/s for 4 hours.

Preparation of Cyan Mill Base F 300 parts by weight of IRGALITE BLUE GLVO, 600 parts by weight of NK-AMP10G (phenoxyethyl acrylate), and 100 parts by weight of SOLSPERSE 32000 were stirred and mixed to give a pigment mill base. As for the preparation of the mill base, the components were put into an M50 disperser motor mill (manufactured by Eiger Machinery, Inc.) to be dispersed using zirconia beads having a diameter of 0.65 mm at a peripheral speed of 9 m/s for 4 hours.

Example 1

The components shown below were stirred using a high-speed water-cooled stirrer to give a cyan UV inkjet ink composition.

Cyan Ink Composition

| | |
|---|---|
| Cyan mill base A (colorant, polymerizable monomer, polymeric dispersant) | 6.0 parts |
| N-vinylcaprolactam (polymerizable monomer) | 30.0 parts |
| tetrahydrofurfryl acrylate (polymerizable monomer) | 54.0 parts |
| Exemplified compound (P-6) (the compound having an ethylenically unsaturated group and a silicone chain) | 2.0 parts |
| FIRSTCURE ST-1 (polymerization inhibitor) | 0.3 parts |
| IRGACURE 819 (radical polymerization initiator) | 4.5 parts |
| Benzophenone (radical polymerization initiator) | 3.2 parts |

Example 2 to 14, and Comparative Example 1 to 6

Each ink composition was prepared in the same manner as in Example 1 except that the type and the amount of the pigment dispersant, the polymerizable compound, the compound having an ethylenically unsaturated group and a silicone chain, the radical polymerization initiator and the polymerization inhibitor were changed as shown in Table 1 or Table 2. The unit of the added amount of each material in Table 1 and Table 2 is 'part by weight'.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| | Color | Cyan | Magenta | Yellow | Black | White | Cyan | Cyan |
| Pigment dispersion | Cyan mill base A | 6 | — | — | — | — | 6 | 6 |
| | Magenta mill base B | — | 12 | — | — | — | — | — |
| | Yellow mill base C | — | — | 12 | — | — | — | — |
| | Black mill base D | — | — | — | 6 | — | — | — |
| | White mill base E | — | — | — | — | 31 | — | — |
| Polymerizable compound | N-vinyl caprolactam | 30 | 30 | 30 | 30 | 25 | 30 | 30 |
| | NK Ester AMP-10G (phenoxyethyl acrylate) | | | | | | | |
| | tetrahydrofurfryl acrylate | 54 | 48 | 48 | 54 | 28.8 | 54 | 54 |

TABLE 1-continued

| | | | | | | | | |
|---|---|---|---|---|---|---|---|---|
| Compound having an ethylenically unsaturated group and a silicone chain | Exemplified compound P-6 | 2 | 2 | 2 | 2 | 2 | — | — |
| | Exemplified compound P-1 | — | — | — | — | — | 2 | — |
| | Exemplified compound P-11 | — | — | — | — | — | — | 2 |
| Polymerization initiator | IRGACURE 819 | 4.5 | 4.5 | 4.5 | 4.5 | — | 4.5 | 4.5 |
| | Lucirin TPO | — | — | — | — | 8.9 | — | — |
| | Benzophenone | 3.2 | 3.2 | 3.2 | 3.2 | 1.8 | 3.2 | 3.2 |
| | IRGACURE 184 | — | — | — | — | 1.2 | — | — |
| | FIRSTCURE ITX | — | — | — | — | 1 | — | — |
| Polymerization inhibitor | FIRSTCURE ST-1 | 0.3 | 0.3 | 0.3 | 0.3 | 0.3 | 0.3 | 0.3 |
| | Total | 100.00 | 100.00 | 100.00 | 100.00 | 100.00 | 100.00 | 100.00 |
| | The total amount of trahydrofurfryl acrylate monomer | 57.6 | 55.2 | 55.2 | 57.6 | 42.75 | 57.6 | 57.6 |
| | The total amount of N-vinyl caprolactam and tetrahydrofurfryl acrylate | 87.6 | 85.2 | 85.2 | 87.6 | 67.75 | 87.6 | 87.6 |

| | | Ex. 8 | Ex.. 9 | Ex. 10 | Ex. 11 | Ex. 12 | Ex. 13 | Ex. 14 |
|---|---|---|---|---|---|---|---|---|
| | Color | Cyan | Cyan | Cyan | Cyan | Cyan | Cyan | Cyan |
| Pigment dispersion | Cyan mill base A | 6 | 6 | 6 | 6 | 6 | 6 | 6 |
| | Magenta mill base B | — | — | — | — | — | — | — |
| | Yellow mill base C | — | — | — | — | — | — | — |
| | Black mill base D | — | — | — | — | — | — | — |
| | White mill base E | — | — | — | — | — | — | — |
| Polymerizable compound | N-vinyl caprolactam | 30 | 30 | 30 | 30 | — | 30 | 30 |
| | NK Ester AMP-10G (phenoxyethyl acrylate) | — | — | — | — | — | 20 | 25 |
| | tetrahydrofurfryl acrylate | 55.9 | 55 | 51 | 50 | 84 | 34 | 29 |
| Compound having an ethylenically unsaturated group and a silicone chain | Exemplified compound P-6 | 0.1 | 1 | 5 | 6 | 2 | 2 | 2 |
| | Exemplified compound P-1 | — | — | — | — | — | — | — |
| | Exemplified compound P-11 | — | — | — | — | — | — | — |
| Polymerization initiator | IRGACURE 819 | 4.5 | 4.5 | 4.5 | 4.5 | 4.5 | 4.5 | 4.5 |
| | Lucirin TPO | — | — | — | — | — | — | — |
| | Benzophenone | 3.2 | 3.2 | 3.2 | 3.2 | 3.2 | 3.2 | 3.2 |
| | IRGACURE 184 | — | — | — | — | — | — | — |
| | FIRSTCURE ITX | — | — | — | — | — | — | — |
| Polymerization inhibitor | FIRSTCURE ST-1 | 0.3 | 0.3 | 0.3 | 0.3 | 0.3 | 0.3 | 0.3 |
| | Total | 100.00 | 100.00 | 100.00 | 100.00 | 100.00 | 100.00 | 100.00 |
| | The total amount of trahydrofurfryl acrylate monomer | 59.5 | 58.6 | 54.6 | 53.6 | 87.6 | 37.6 | 32.6 |
| | The total amount of N-vinyl caprolactam and tetrahydrofurfryl acrylate | 89.5 | 88.6 | 84.6 | 83.6 | 87.6 | 67.6 | 62.6 |

TABLE 2

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| | Color | Cyan | Cyan | Cyan | Cyan | Cyan | Cyan |
| Pigment dispersion | Cyan mill base F | 6 | 6 | 6 | 6 | 6 | 6 |
| Polymerizable compound | N-vinyl caprolactam | 30 | 30 | 30 | 30 | 30 | 30 |
| | NK Ester AMP-10G (phenoxyethyl acrylate) | 54 | — | — | — | — | — |
| | FANCRYL FA-512A (dicyclopentenyloxyethyl acrylate) | — | 54 | — | — | — | — |
| | FANCRYL FA-513AS (dicyclopentanyl acrylate) | — | — | 54 | — | — | — |
| | SR506 (isobornyl acrylate) | — | — | — | 54 | — | — |
| | tetrahydrofurfryl acrylate | — | — | — | — | 56 | 54 |
| | SR9003 (propylene glycol-modified neopentyl glycol diacrylate) | — | — | — | — | — | 2 |
| Compound having an ethylenically unsaturated group and a silicone chain | Exemplified compound P-6 | 2 | 2 | 2 | 2 | — | — |
| Polymerization initiator | IRGACURE 819 | 4.5 | 4.5 | 4.5 | 4.5 | 4.5 | 4.5 |
| | Lucirin TPO | — | — | — | — | — | — |
| | Benzophenone | 3.2 | 3.2 | 3.2 | 3.2 | 3.2 | 3.2 |
| | IRGACURE 184 | — | — | — | — | — | — |
| | FIRSTCURE ITX | — | — | — | — | — | — |
| Polymerization inhibitor | FIRSTCURE ST-1 | 0.3 | 0.3 | 0.3 | 0.3 | 0.3 | 0.3 |
| | Total | 100.00 | 100.00 | 100.00 | 100.00 | 100.00 | 100.00 |
| | The total amount of trahydrofurfryl acrylate monomer | — | — | — | — | 56 | 54 |
| | The total amount of N-vinyl caprolactam and tetrahydrofurfryl acrylate | 30 | 30 | 30 | 30 | 86 | 84 |

Inkjet recording shown below was carried out using each of the ink compositions obtained in Examples 1 to 14 and Comparative Examples 1 to 6. Furthermore, evaluations of curability, anti-blocking properties and stretchability, embossing test, vacuum molding test, and hole making were carried out as follows. The results are given in Table 3.

Inkjet Image Recording Method

With regard to the inkjet recording method, image formation was carried out on a recording medium using an experimental inkjet recording device having a piezo system inkjet nozzle. The ink supply system comprised a main tank, a supply pipe, an ink supply tank immediately before an inkjet head, a filter, and a piezo system inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 45° C.±2° C. The piezo system inkjet head was driven so as to discharge multisize dots of 8 to 30 pL at a resolution of 720×720 dpi. The exposure system, the main scanning speed, and the discharge frequency were adjusted so that, after landing, UV light was focused to give an exposure area illumination intensity of 2,100 $mW/cm^2$, and irradiation started 0.1 sec. after the ink landed on the recording medium. The cumulative amount of light applied to an image was adjusted so as to be 3,000 $mJ/cm^2$. The UV lamp employed a HAN250NL high-cure mercury lamp (manufactured by GS Yuasa Corporation). Here, dpi referred to in the present invention denotes the number of dots per 2.54 cm. The recording medium employed an E5000 ester film (film thickness 125 μm, manufactured by Toyobo Co., Ltd.). Printing was carried out so that each sample had an average film thickness of 12 μm for the cured ink composition coating.

Method for Measuring Curing Sensitivity (Curability)

In accordance with the above-mentioned inkjet recording method, a solid printed image having an average coating thickness of 12 μm was formed, and the tackiness of the image was evaluated by touch after the image was irradiated with ultraviolet rays.

The curing sensitivity was evaluated using the following criteria.

3: No tackiness on image.
2: Image was slightly tacky.
1: Not hardened, to the extent that uncured ink was transferred to the hand.

Method for Measuring Anti-Blocking Properties

In accordance with the above-mentioned inkjet recording method, a solid image having an average coating thickness of 12 μm was drawn, an unprinted E5000 ester film was then superimposed on top of the cured coating so that the entire cured coating of the printed material was covered, a load of 0.200 $g/cm^2$ was applied from above, and it was left to stand in an atmosphere of 30° C. for one day.

Curing sensitivity was evaluated using the following criteria.

4: No transfer or sticking to the upper film.
3: Transfer to the upper film was less than 1% of the entire film area.
2: Transfer to the upper film was at least 1% but no greater than 5% of the entire film area.
1: Transfer to the upper film was 5% or greater of the entire film area.

Method for Measuring Stretchability

A solid image having an average film thickness of 12 μm was drawn in accordance with the above-mentioned inkjet recording method except that FASSON PE (film thickness 100 μm, polyethylene film, manufactured by Fasson) was used as a support, a piece having a width of 2.5 cm and a length of 5.0 cm was cut out, a tensile test was carried out using an Autograph AGS-J precision universal tester manufactured by Shimadzu Corporation, and the percentage elongation relative to the length was measured.

Molding Process Evaluation Method

Embossing Test

A printed material was prepared in the same manner as the inkjet recording method described above except that HK31-WF (film thickness 188 μm, surface-treated PET, manufactured by Higashiyama Film Corporation) was used as a support. Under conditions of 25° C., a printed material thus formed was sandwiched between stainless steel projecting and recessed molds shown in FIG. 1, and a load of 250 kg was applied thereto for 5 sec using a MIZUHO model A hand power press (manufactured by Matsushita Electric Tools Co., Ltd.), thus carrying out embossing. The embossed area on the image was visually examined for the occurrence of cracks or pinholes. Those without cracking or pinholes were evaluated as being good.

Vacuum Molding Test

Figure 2:
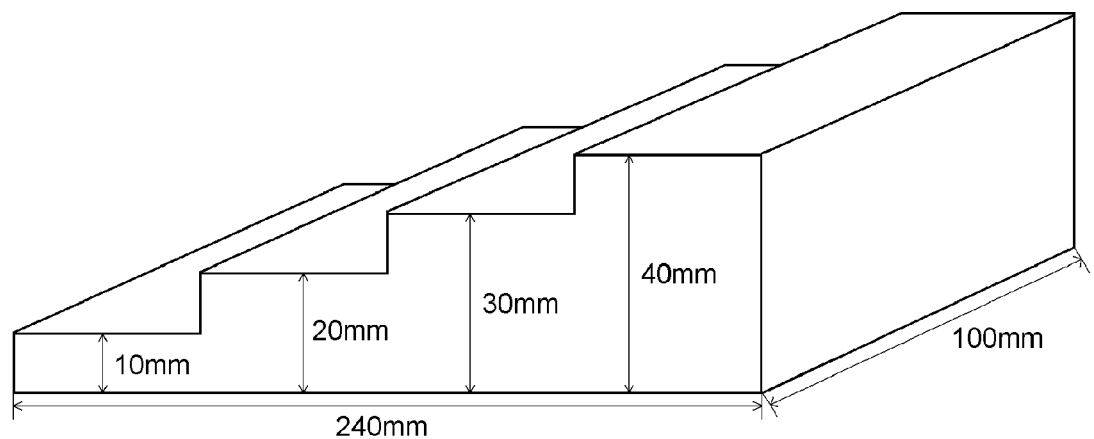
FIG. 2 shows a schematic diagram of a wooden mold used in a vacuum forming test.

A printed material was formed by the same method as above except that Panlite PC-1151 (film thickness 500 μm, polycarbonate sheet, manufactured by Teijin Chemicals Ltd.) was used as a support, and this printed material was then subjected to vacuum molding using a Forming 300× vacuum molding system (manufactured by Seiko Sangyo Co., Ltd.). A wooden mold shown in FIG. 2 was placed at the center of a vacuum table of the vacuum molding system, after the support temperature reached 130° C. to 150° C. the vacuum table on which the wooden mold was placed was slowly raised while operating a table raise/lower lever, and vacuum molding was carried out. The formed printed material was visually examined for the occurrence of cracking and pinholes. Those without cracking or pinholes were evaluated as being good.

Hole Making Test

A printed material was formed by the same method as in the above-mentioned inkjet recording method except that Panlite PC-1151 (film thickness 500 μm, polycarbonate sheet, Teijin Chemicals Ltd.) was used as a support. The printed material thus formed was subjected to hole making under conditions of 25° C. using a No. 200N manual OA large-size hole-making punch (Lion Office Products Corp.). Cracking and light transmission in the portion of the image in which a hole was made were examined visually. Those without cracking or light transmission were evaluated as being good.

TABLE 3

|  | Curability | Anti-blocking properties | Stretchability | Embossing test | Vacuum molding test | Hole making test |
|---|---|---|---|---|---|---|
| Ex. 1 | 3 | 4 | 230% | Good | Good | Good |
| Ex. 2 | 3 | 4 | 230% | Good | Good | Good |
| Ex. 3 | 3 | 4 | 230% | Good | Good | Good |
| Ex. 4 | 3 | 4 | 230% | Good | Good | Good |

TABLE 3-continued

|  | Curability | Anti-blocking properties | Stretchability | Embossing test | Vacuum molding test | Hole making test |
|---|---|---|---|---|---|---|
| Ex. 5 | 3 | 4 | 230% | Good | Good | Good |
| Ex. 6 | 3 | 4 | 230% | Good | Good | Good |
| Ex. 7 | 3 | 3 | 230% | Good | Good | Good |
| Ex. 8 | 3 | 4 | 230% | Good | Good | Good |
| Ex. 9 | 3 | 4 | 230% | Good | Good | Good |
| Ex. 10 | 3 | 4 | 200% | Good | Good | Good |
| Ex. 11 | 3 | 4 | 200% | Good | Good | Good |
| Ex. 12 | 2 | 3 | 140% | Good | Good | Good |
| Ex. 13 | 3 | 4 | 170% | Good | Good | Good |
| Ex. 14 | 3 | 4 | 140% | Good | Good | Good |
| Comp. Ex. 1 | 3 | 2 | 100% | Good | Good at not highter than 30 mm, but cracking occurred at the height of 40 mm in edge portion | Cracking was observed around the hole and light passed through cracking |
| Comp. Ex. 2 | 3 | 3 | 40% | Good | Good at not highter than 20 mm, but cracking occurred at the height of 30 mm in edge portion | Cracking was observed around the hole and light passed through cracking |
| Comp. Ex. 3 | 3 | 4 | 3% | Good | Good at not highter than 20 mm, but cracking occurred at the height of 30 mm in edge portion | Cracking was observed around the hole and light passed through cracking |
| Comp. Ex. 4 | 3 | 4 | 3% | Good | Good at not highter than 20 mm, but cracking occurred at the height of 30 mm in edge portion | Cracking was observed around the hole and light passed through cracking |
| Comp. Ex. 5 | 2 | 1 | 230% | The printed material adhered to the mold and partially transferred | The printed material adhered to the mold and partially transferred | Good |
| Comp. Ex. 6 | 3 | 1 | 200% | The printed material adhered to the mold and partially transferred | The printed material adhered to the mold and partially transferred | Good |

The invention claimed is:

1. An ink composition comprising:
(A) a polymerizable silicone compound having an ethylenically unsaturated group and a silicone chain;
(B) tetrahydrofurfuryl (meth)acrylate;
(C) a radical polymerization initiator; and
(D) N-vinylcaprolactam,
wherein the total amount of N-vinylcaprolactam and tetrahydrofurfuryl (meth)acrylate is at least 60 wt % of the total weight of the ink composition.

2. The ink composition according to claim 1, wherein the ethylenically unsaturated group is selected from the group consisting of a (meth)acryloyloxy group, a vinyl group, an N-vinyl group, a (meth)acrylamide group, and an allyl group.

3. The ink composition according to claim 1, wherein the ethylenically unsaturated group is a (meth)acryloyloxy group or an allyl group.

4. The ink composition according to claim 1, wherein the polymerizable silicone compound (A) has a dimethylsiloxane chain and an alkyleneoxy chain.

5. The ink composition according to claim 1, wherein the polymerizable silicone compound (A) is a compound represented by Formula (3)

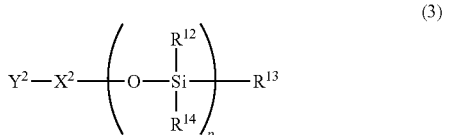

(3)

wherein $Y^2$ denotes an ethylenically unsaturated group-containing polymer chain, $X^2$ denotes a single bond or a divalent organic linking group, p denotes an integer of 1 or greater, $R^{12}$, $R^{13}$, and $R^{14}$ independently denote a hydrogen atom, a phenyl group, or an alkyl group having 1 to 18 carbon atoms, and when p is 2 or greater the plurality of $R^{12}$s may be identical groups or different groups and the plurality of $R^{14}$s may be identical groups or different groups.

6. The ink composition according to claim 5, wherein $Y^2$ is a (meth)acrylic resin polymer chain.

7. The ink composition according to claim 5, wherein the polymerizable silicone compound (A) is represented by Formula (3) above, and the ethylenically unsaturated group-containing polymer chain denoted by $Y^2$ is a copolymer of a compound represented by Formula (4) and another (meth)acrylic acid ester

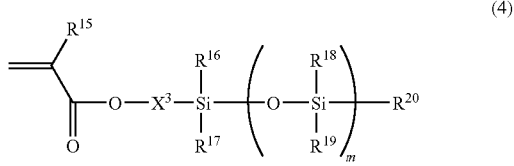

(4)

wherein $R^{15}$ denotes a hydrogen atom, a methyl group, or an ethyl group, $R^{16}$, $R^{17}$, $R^{18}$, $R^{19}$, and $R^{20}$ independently denote a hydrogen atom, a phenyl group, or an alkyl group having 1 to 18 carbon atoms, $X^3$ denotes a divalent linking group, and m denotes a positive integer.

8. The ink composition according to claim 7, wherein the polymerizable silicone compound (A) is a copolymer represented by Formula (5)

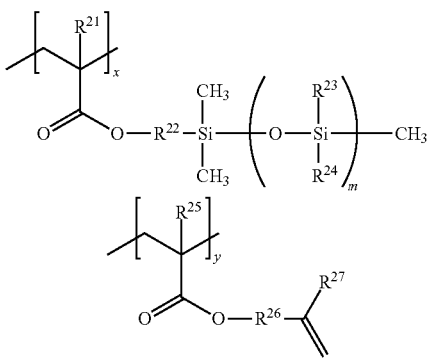
(5)

wherein $R^{21}$, $R^{25}$, and $R^{27}$ independently denote a hydrogen atom or a methyl group, $R^{23}$ and $R^{24}$ independently denote a lower alkyl group, $R^{22}$ and $R^{26}$ denote a divalent organic linking group, m denotes a positive integer, and x and y denote copolymerization ratios.

9. The ink composition according to claim 1, wherein the polymerizable silicone compound (A) has a number-average molecular weight of 500 to 100,000.

10. An inkjet recording method comprising:
($a^1$) a step of discharging onto a recording medium the ink composition according to claim 1; and
($b^1$) a step of curing the ink composition by irradiating the discharged ink composition with actinic radiation.

11. A printed material obtained by the inkjet recording method according to claim 10.

12. A process for producing a formed printed material comprising:
($a^2$) a step of forming an image on a support by discharging the ink composition according to any one of claims 1 to 9 by an inkjet method;
($b^2$) a step of obtaining a printed material having a cured image on the support by irradiating the obtained image with actinic radiation so as to cure the ink composition; and
($c^2$) a step of molding the printed material.

13. The ink composition according to claim 1, wherein the total amount of N-vinylcaprolactam and tetrahydrofurfuryl (meth)acrylate is 65 to 90 wt % of the total weight of the ink composition.

14. The ink composition according to claim 1, wherein the content of tetrahydrofurfuryl (meth)acrylate is 35 to 85 wt % to the total weight of the ink composition.

15. The ink composition according to claim 1, wherein the content of N-vinylcaprolactam is 20 to 35 wt % to the total weight of the ink composition.

\* \* \* \* \*